(12) United States Patent
Vempala et al.

(10) Patent No.: US 7,752,233 B2
(45) Date of Patent: Jul. 6, 2010

(54) TECHNIQUES FOR CLUSTERING A SET OF OBJECTS

(75) Inventors: Santosh Vempala, Atlanta, GA (US); Grant Wang, Mt. View, CA (US); Ravi Kannan, Hamden, CT (US); David Cheng, New York, NY (US)

(73) Assignees: Massachusetts Institute of Technology, Cambridge, MA (US); Yale University, New Haven, CT (US)

( * ) Notice: Subject to any disclaimer, the term of this patent is extended or adjusted under 35 U.S.C. 154(b) by 436 days.

(21) Appl. No.: 11/731,008

(22) Filed: Mar. 29, 2007

(65) Prior Publication Data

US 2008/0010304 A1 Jan. 10, 2008

Related U.S. Application Data

(60) Provisional application No. 60/787,064, filed on Mar. 29, 2006.

(51) Int. Cl.
*G06F 17/30* (2006.01)
(52) U.S. Cl. ...................... 707/802; 707/790
(58) Field of Classification Search ............... 707/6–7, 707/100; 702/179; 382/224–225
See application file for complete search history.

(56) References Cited

U.S. PATENT DOCUMENTS

| 6,226,408 | B1 * | 5/2001 | Sirosh | 382/224 |
|---|---|---|---|---|
| 6,260,038 | B1 * | 7/2001 | Martin et al. | 707/7 |
| 6,307,965 | B1 * | 10/2001 | Aggarwal et al. | 382/225 |
| 6,397,166 | B1 * | 5/2002 | Leung et al. | 702/179 |
| 6,421,668 | B1 * | 7/2002 | Yakhini et al. | 707/6 |
| 6,640,227 | B1 * | 10/2003 | Andreev | 707/6 |
| 2004/0103108 | A1 * | 5/2004 | Andreev et al. | 707/100 |

OTHER PUBLICATIONS

"On Clusterings: Good, Bad and Spectral", Kannan et al., Journal of the ACM, vol. 51, No. 3, p. 497-515, May 2004. -also published/made publicly available on the internet Jan. 2004.
"On Clusterings: Good, Bad and Spectral", Kannan et al., Proceedings of the 41$^{st}$ Annual Symposium on Foundations of Computer Science, 2000, p. 367-377.
"On a Recursive Spectral Algorithm for Clustering from Pairwise Similarities", Cheng et al, MIT LCS Technical Report, MIT-LCS-TR-906, May 2003.
"A Divide-and-Merge Methodology for Clustering", Cheng et al., Proceedings of the ACM Symposium on Principles of Database Systems, Jul. 2005. (10 pages)—also published/ made publicly available on the internet Mar. 30, 2005.

(Continued)

*Primary Examiner*—Don Wong
*Assistant Examiner*—Sheree N Brown
(74) *Attorney, Agent, or Firm*—Muirhead and Saturnelli, LLC

(57) ABSTRACT

Described are techniques for clustering a data set of objects. Divide phase processing is performed to partition the data set into two or more partitions forming a hierarchy of the objects. Merge phase processing may be performing using the hierarchy to determine one or more disjoint clusters of objects of the data set. Optional preprocessing may be performed to determine weights for one or more features of an object.

33 Claims, 20 Drawing Sheets

OTHER PUBLICATIONS

A Divide-and-Merge Methodology for Clustering, Cheng et al., ACM Transactions on Database Systems (TODS), vol. 31, Issue 4, 2006. (26 pages).

"A simple linear time (1+ϵ)-approximation algorithm for k-means clustering in any dimensions", Kumar et al. Proceedings of the 45th Annual IEEE Symposium on Foundations of Computer Science, pp. 454-462, 2004.

"Incremental clustering and dynamic information retrieval", Charikar et al., Proceedings of the 29th Annual ACM Symposium on Theory of Computing, pp. 626-635, 1997.

"Approximation schemes for clustering problems", W.F. de la Vega, et al., Proceedings of the 35th Annual ACM Symposium on Theory of Computing, pp. 50-58, 2003.

"Correlation clustering", N. Bansal, et al., Proceedings of the 43rd IEEE Symposium on Foundations of Computer Science, pp. 238-247, 2002.

"Clustering with qualitative information", M. Charikar et al., Proceedings of the 44th Annual IEEE Symposium on Foundations of Computer Science, pp. 524-533, 2003.

"Correlation clustering with partial information", E.D. Demaine et al., Proceedings of the 6th International Workshop on Approximation Algorithms for Combinatorial Optimization Problems, 2003.

"Correlation clustering-minimizing disagreements on arbitrary weighted graphs", D. Emanuel et al, Proceedings of the 11th European Symposium on Algorithms, pp. 208-220, 2003.

"Correlation clustering: Maximizing agreements via semidefinite programming", C. Swamy, Proceedings of ACM-SIAM Symposium on Discrete Algorithms, pp. 519-520, 2004.

A coded implementation of portions of the subject matter of the patent application was publicly available on Mar. 30, 2005 at http://eigencluster.csail.mit.edu for use as a web search engine. The implementation performed processing steps of the divide phase and merge phase using a single fixed objective function and did not incorporate features of the preprocessing phase for feature selection as described in the application.

A coded implementation of portions of the subject matter of the patent application was publicly available not earlier than Jun. 1, 2003 at http://eigencluster.csail.mit.edu for use as a web search engine. The implementation performed processing steps of the divide phase and as described in reference CA above (MIT LCS Technical Report, MIT-LCS-TR-906, May 2003). The implementation did not incorporate features of the merge phase and did not incorporate features of the preprocessing phase for feature selection as described in the application.

\* cited by examiner $$160 \qquad \underbrace{\text{Matrix A}}_{162} \quad \underbrace{\begin{Bmatrix} w1 & \ldots & wn \end{Bmatrix}}_{164} = \underbrace{\begin{Bmatrix} b1 & \ldots & bn \end{Bmatrix}}_{166}$$

FIGURE 4

| Partition 1 | Partition 2 | Conductance |
|---|---|---|
| A | BCD | 3/1 = 3 |
| B | ACD | 3/1 = 3 |
| C | ABD | 3/1 = 3 |
| D | ABC | 3/1 = 3 |
| AB | CD | 4/2 = 2 |
| AC | BD | 6/2 = 3 |
| AD | BC | 2/2 = 1 |

FIGURE 7

TECHNIQUES FOR CLUSTERING A SET OF OBJECTS

CROSS-REFERENCE TO RELATED APPLICATIONS

This application claims priority from U.S. Provisional Application No. 60/787,064, filed Mar. 29, 2006, EIGENCLUSTER: A DIVIDE-AND-MERGE METHOD FOR FINDING INNATE CLUSTERINGS ON THE FLY, which is incorporated herein by reference.

STATEMENT OF GOVERNMENT INTEREST

This invention was made with Government support under Grant Number CCR-0312339, awarded by NSF. The Government has certain rights in the invention.

BACKGROUND

1. Technical Field

This application generally relates to techniques for information organization, and more particularly to techniques used in connection with clustering a set of objects so that similar objects are in a same group and dissimilar objects are in different groups.

2. Description of Related Art

Data may be stored in an electronic form for use with computerized techniques. A large amount of computerized data used in connection with a variety of different applications presents a challenge for how to locate and organize relevant information. Clustering refers to the process of classifying a set of data objects, such as documents included in the computerized data, into groups so that each group includes similar objects and objects belonging to other groups are dissimilar. In other words, objects of a first group are similar to one another but are also dissimilar with respect to other objects belonging to other groups. Existing techniques for clustering objects include a hierarchical clustering approach or a partitional approach. Hierarchical algorithms proceed successively by either merging smaller clusters into larger ones, or by splitting larger clusters. In contrast, partitional algorithms determine all clusters at once by decomposing the data set into a set of disjoint clusters. Hierarchical clustering algorithms can be further described as either a divisive method (i.e., top-down) or an agglomerative method (i.e., bottom-up). A divisive algorithm begins with the entire set and recursively partitions that data set it into two (or more) pieces, forming a tree. An agglomerative algorithm starts with each object in its own cluster and iteratively merges clusters.

SUMMARY OF THE INVENTION

In accordance with one aspect of the invention is a method for clustering a data set of objects comprising: performing divide phase processing to partition the data set into two or more partitions forming a hierarchy of the objects; and performing merge phase processing using the hierarchy to determine one or more disjoint clusters of objects of the data set. The divide phase processing may further comprise: partitioning the data set into two partitions; and repeatedly partitioning each of the two partitions, wherein the hierarchy has a number of levels in accordance with a number of times the data set, or a portion thereof, is partitioned. The divide phase processing may partition a portion of the data set into two pieces, each of said two pieces have a number of objects determined in accordance with one or more dividing criteria. Merge phase processing may further comprise merging objects of the data set into one or more clusters in accordance with one or more merging criteria and in accordance with nodes of the hierarchy, each node being associated with one or more objects of the data set. An input to the divide phase may be a matrix of pairwise similiarities between pairs of objects in the data set. A pairwise similarity between a pair of objects may be expressed as an inner product of a first vector of features characterizing a first object of the pair and a second vector of features characterizing a second object of the pair. The divide phase may further comprise: normalizing each row of the matrix of similarities based on a sum of each row; computing a second largest eigenvector of the matrix; sorting eigenvector elements in increasing order, the eigenvector having n elements; evaluating "n−1" cuts in accordance with one or more divide phase criteria, each of said "n−1" cuts indicating one way in which the objects are partitioned with a first portion of objects included in a first partition and a second portion of remaining objects included in a second partition; selecting one of said "n−1" cuts in accordance with the divide phase criteria; and performing said normalizing, said computing, said sorting, said evaluating and said selecting steps recursively on each of said first partition and said second partition. The selecting step may select one of the "n−1" cuts resulting in two partitions, S and T, of objects in the data set that minimizes conductance represented as a sum of similarities between each pair of objects, wherein a first object in said each pair is in S and a second object in said each pair is in T, divided by a smaller of a size of S and a size of T, and wherein each similarity is expressed as a product of a first feature vector for said first object and a second feature vector for said second object. The hierarchy may be a tree having a root node at a top level, one or more leaf nodes at a bottom-most level and one or more non-leaf nodes at one or more levels between said top level and said bottom-most level, wherein said merge phase may recursively perform bottom-up processing of said tree to merge objects associated with nodes of the tree starting with the one or more leaf nodes and progressing upward toward the root node, and merging objects of the data set into one or more clusters in accordance with one or more merging criteria and in accordance with nodes of the hierarchy, each node being associated with one or more objects of the data set. The merge phase may further comprise performing, for each leaf node at a bottom-most level in said tree: evaluating, in accordance with one or more merging criteria, one or more clustering configuration options used in forming k clusters for each value of k, $1 \leq k \leq n$, n representing a maximum number of clusters formed for the bottom-most level; selecting a best clustering configuration option for each value of k; and performing said evaluating and said selecting for each ancestor node of each leaf node. The method may also include performing said evaluating and said selecting for each ancestor node after evaluating the clustering configurations for the children of each ancestor node until said evaluating and said selecting has been performed for said root node. The one or more merging criteria may include an objective function evaluated using dynamic programming. The merging criteria may include a k-means objective function generating a return value for a clustering configuration of one or more clusters by determining a sum of squared distances of objects in each cluster of the clustering configuration to a centroid of the cluster, and then adding the sums for each of the clusters to determine a final sum as said return value, and said selecting selects a clustering configuration having a smallest return value determined by the k-means objective function, wherein a distance of an object is a difference between a first value associated with the object and the average of the first values for objects in said each cluster. The merging criteria may include a min-diameter objective function generating a return value for a clustering configuration of one or more clusters by determining, for each cluster, a diameter determined as a maximum distance between any pair of objects in said each cluster of the clustering configuration, and then determining as said return value a maximum of the diameters for each of the clusters, and said selecting selects a clustering configuration having a smallest return value determined by the min-diameter objective function, wherein a distance between a pair of objects is a difference between values associated with each object of the pair. The merging criteria may include a min-sum objective function generating a return value for a clustering configuration of one or more clusters by determining, for each cluster in the clustering configuration, a sum of pairwise distances within said each cluster and adding said sums for each cluster to determine a final sum as said return value, and said selecting selects a clustering configuration having a smallest return value determined by the min-sum objective function, wherein a distance between a pair of objects is a difference in between values associated with each object of the pair. The merging criteria may include a correlation clustering objective function generating a return value for a clustering configuration of one or more clusters, the method may further comprise: receiving an indicator for each pair of objects in the data set, said indicator indicating whether the pair of objects is similar or dissimilar; determining a first sum for each of the one or more clusters, the first sum representing the number of similar pairs of objects in said each cluster; determining a second sum representing a number of dissimilar pairs of objects wherein a first object of each pair is in a different cluster than a second object of said each pair; and determining a final sum as said return value by adding said first sum for each of the one or more clusters and said second sum, and wherein said selecting selects a clustering configuration having a largest value determined by the correlation clustering objective function. Each object in the data set may be described by a vector of one or more feature values for corresponding one or more features characterizing said each object, and the method may further comprise prior to said divide phase processing, performing preprocessing to determine weights for each of said one or more features. The divide phase may use a matrix of pairwise similarities between pairs of objects in the data set, similarity between two objects being represented as a product of feature values for said two objects, and the method may further comprise: determining weighted similarities between pairs of objects as a product of the weights for said one or more features, a first vector of feature values for a first object in a pair, and a second vector of feature values for a second object in the pair; and using said weighted similarities in said divide phase processing to partition the data set into two or more partitions.

In accordance with another aspect of the invention is a method for clustering a data set of objects comprising: repeatedly dividing the data set to form a tree structure based on similarities between pairs of objects and one or more divide phase criteria, each node of the tree structure being associated with one or more objects of the data set, wherein a level is formed in the tree structure each time the data set, or a portion thereof, is partitioned; and starting with leaves of the tree structure and progressing toward a root of the tree structure, merging nodes of the tree structure to form one or more clusters in accordance with one or more merging criteria, each of said one or more clusters being a subtree of the tree structure, wherein the subtree has a root at a node of the tree structure generated by said repeatedly dividing, wherein objects in a same cluster are determined to be similar to one another and objects in a different cluster are determined to be dissimilar from one another. The tree structure may include one or more leaf nodes, each of the one or more leaf nodes being associated with a single object in the data set. The merging criteria may be used to determine a best way to cluster objects in accordance with the tree structure.

In accordance with another aspect of the invention is a computer readable medium comprising code stored thereon for clustering a data set of objects, the computer readable medium comprising code stored thereon for: performing divide phase processing to partition the data set into two or more partitions forming a hierarchy of the objects; and performing merge phase processing using the hierarchy to determine one or more disjoint clusters of objects of the data set. The code for performing the divide phase processing may further comprise code for: partitioning the data set into two partitions; and repeatedly partitioning each of the two partitions, wherein the hierarchy has a number of levels in accordance with a number of times the data set, or a portion thereof, is partitioned. The code for performing the divide phase processing may partition a portion of the data set into two pieces, each of said two pieces have a number of objects determined in accordance with one or more dividing criteria. The code for performing merge phase processing may further comprise code for: merging objects of the data set into one or more clusters in accordance with one or more merging criteria and in accordance with nodes of the hierarchy, each node being associated with one or more objects of the data set, and wherein an input to the divide phase is a matrix of pairwise similarities between pairs of objects in the data set, a pairwise similarity between a pair of objects is expressed as an inner product of a first vector of features characterizing a first object of the pair and a second vector of features characterizing a second object of the pair. The code for performing the divide phase processing may further comprise code for: normalizing each row of the matrix of similarities based on a sum of each row; computing a second largest eigenvector of the matrix; sorting eigenvector elements in increasing order, the eigenvector having n elements; evaluating "n−1" cuts in accordance with one or more divide phase criteria, each of said "n−1" cuts indicating one way in which the objects are partitioned with a first portion of objects included in a first partition and a second portion of remaining objects included in a second partition; selecting one of said "n−1" cuts in accordance with the divide phase criteria; and performing said normalizing, said computing, said sorting, said evaluating and said selecting steps recursively on each of said first partition and said second partition. The code for said selecting may select one of the "n−1" cuts resulting in two partitions, S and T, of objects in the data set that minimizes conductance represented as a sum of similarities between each pair of objects, wherein a first object in said each pair is in S and a second object in said each pair is in T, divided by a smaller of a size of S and a size of T, and wherein each similarity is expressed as a product of a first feature vector for said first object and a second feature vector for said second object. The hierarchy may be a tree having a root node at a top level, one or more leaf nodes at a bottom-most level and one or more non-leaf nodes at one or more levels between said top level and said bottom-most level, wherein said merge phase recursively performs bottom-up processing of said tree to merge objects associated with nodes of the tree starting with the one or more leaf nodes and progressing upward toward the root node, and said merge phase merges objects of the data set into one or more clusters in accordance with one or more merging criteria and in accordance with nodes of the hierarchy, each node being associated with one or more objects of the data set.

The code for performing the merge phase processing may further comprise code for performing, for each leaf node at a bottom-most level in said tree: evaluating, in accordance with one or more merging criteria, one or more clustering configuration options used in forming k clusters for each value of k, $1 \leq k \leq n$, n representing a maximum number of clusters formed for the bottom-most level; selecting a best clustering configuration option for each value of k; and performing said evaluating and said selecting for each ancestor node of each leaf node. The computer readable medium may also include code for performing said evaluating and said selecting for each ancestor node after evaluating the clustering configurations for the children of each ancestor node until said evaluating and said selecting has been performed for said root node. One or more merging criteria may include an objective function evaluated using dynamic programming. Each object in the data set may be described by a vector of one or more feature values for corresponding one or more features characterizing said each object, and the computer readable medium further comprising code for: prior to said divide phase processing, performing preprocessing to determine weights for each of said one or more features. The divide phase may use a matrix of pairwise similarities between pairs of objects in the data set, similarity between two objects being represented as a product of feature values for said two objects, and the computer readable medium may further comprise code for: determining weighted similarities between pairs of objects as a product of the weights for said one or more features, a first vector of feature values for a first object in a pair, and a second vector of feature values for a second object in the pair; and using said weighted similarities in said divide phase processing to partition the data set into two or more partitions.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an illustration of determining the weights by solving a system of linear equations;

FIG. 7 is a table representing the set of partitions formed by possible cuts;

DETAILED DESCRIPTION OF EMBODIMENT(S)

Figure 1A:
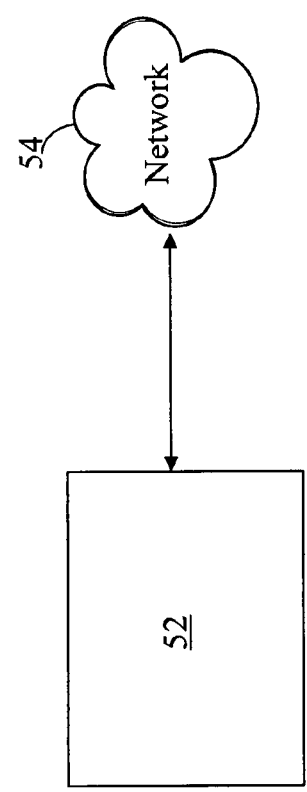
FIG. 1A is an example of an embodiment of a system that may utilize the techniques described herein.

Referring now to FIG. 1A, illustrated is an example of a suitable computing environment in which embodiments utilizing the techniques described herein may be implemented. The computing environment illustrated in FIG. 1A is only one example of a suitable computing environment and is not intended to suggest any limitation as to the scope of use or functionality of the techniques described herein for clustering a set of objects. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1A are a computer 52 and a network 54. The computer 52 may include a standard, commercially-available computer or a special-purpose computer that may be used to execute one or more program modules. Described in more detail elsewhere herein are program modules that may be executed by the computer 52 in connection with clustering a set of objects using techniques described herein. The computer 52 may operate standalone as well as in a networked environment and communicate with other computers not shown in FIG. 1A.

It will be appreciated by those skilled in the art that although the computer is shown in the example as communicating in a networked environment, the computer 52 may communicate with other components utilizing different communication mediums. For example, the computer 52 may communicate with one or more components utilizing a network connection, and/or other type of link known in the art including, but not limited to, the Internet, an intranet, or other wireless and/or hardwired connection(s).

Figure 1B:
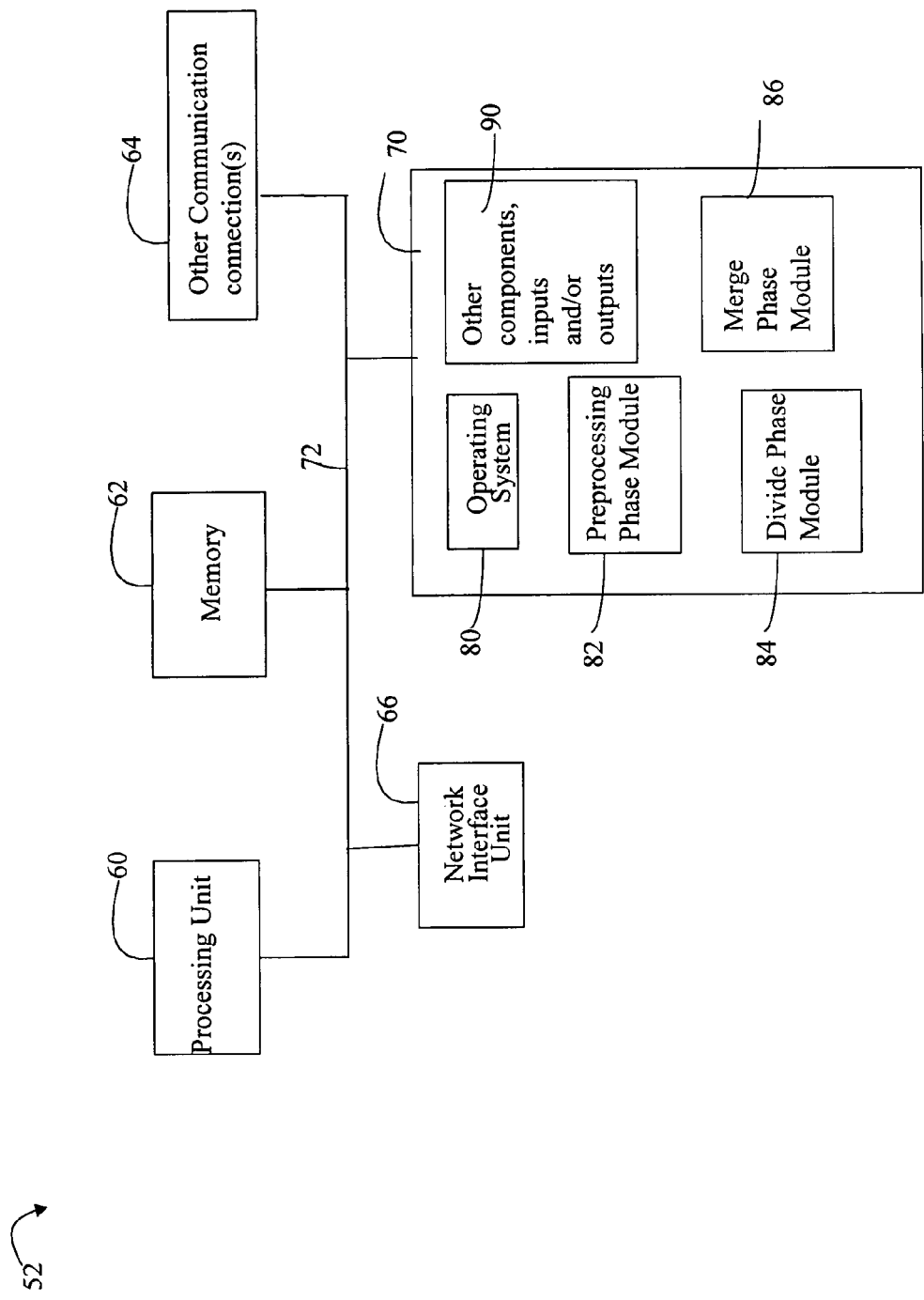
FIG. 1B is an example illustrating in more detail different components of a computer as illustrated in FIG. 1A.

Referring now to FIG. 1B, shown is an example of components that may be included in a computer 52 as may be used in connection with performing the various embodiments of the techniques described herein. The computer 52 may include one or more processing units 60, memory 62, a network interface unit 66, storage 70, one or more other communication connections 64, and a system bus 72 used to facilitate communications between the components of the computer 52.

Depending on the configuration and type of computer 52, memory 62 may be volatile (such as RAM), non-volatile (such as ROM, flash memory, etc.) or some combination of the two. Additionally, the computer 52 may also have additional features/functionality. For example, the computer 52 may also include additional storage (removable and/or non-removable) including, but not limited to, USB devices, magnetic or optical disks, or tape. Such additional storage is illustrated in FIG. 1B by storage 70. The storage 70 of FIG. 1B may include one or more removable and non-removable storage devices having associated computer-readable media that may be utilized by the computer 52. The storage 70 in one embodiment may be a mass-storage device with associated computer-readable media providing non-volatile storage for the computer 52. Although the description of computer-readable media as illustrated in this example may refer to a mass storage device, such as a hard disk or CD-ROM drive, it will be appreciated by those skilled in the art that the computer-readable media can be any available media that can be accessed by the computer 52. Computer readable media includes volatile and nonvolatile, removable and non-removable media implemented in any method or technology for storage of information such as computer readable instructions, data structures, program modules or other data as may be used in connection with the techniques herein. Computer readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by computer 52.

The computer 52 may also contain communications connection(s) 64 that allow the computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 64 are an example of communication media.

In one embodiment, the computer 52 may operate in a networked environment as illustrated in FIG. 1A using logical connections to remote computers through a network. The computer 52 may connect to the network 54 of FIG. 1A through a network interface unit 66 connected to bus 72. The network interface unit 66 may also be utilized in connection with other types of networks and/or remote systems and components.

One or more program modules and/or data files may be included in storage 30. During operation of the computer 52, one or more of these elements included in the storage 70 may also reside in a portion of memory 62, such as, for example, RAM for controlling the operation of the computer 52. The example of FIG. 1B illustrates various components including an operating system 40, a preprocessing module 82, a divide phase module 84, a merge phase module 86, and other components, inputs, and/or outputs 90. The operating system 80 may be any one of a variety of commercially available or proprietary operating systems. The operating system 80, for example, may be loaded into memory in connection with controlling operation of the computer. The modules 82, 84 and 86 may be used in connection with techniques described herein for clustering of a set of objects. The techniques herein combine a top-down divide phase, as may be performed by the divide phase module 84, with a bottom-up merge phase, as may be performed by the merge phase module. The preprocessing phase module 82 may be used to perform optional preprocessing for determining a set of weights used to accordingly weight inputs used with the subsequent divide phase processing. The foregoing components included in FIG. 1B, as well as other inputs and outputs, are described in more detail in following paragraphs.

Although the components, such as the different modules 82, 84 and 86, are shown as being included in a single computer system, the components may be included on different computer systems and operate in accordance with the techniques described herein. For example, a preprocessor module 82 may be included and operate on a first computer. The divide phase module 84 and merge phase module 86 may be included and operate on another computer system connected to the first computer, such as through the network 14 as illustrated in FIG. 1A. During operation, the first computer may execute code of the module 82 to generate output that may be optionally used by the divide phase module 84 on the other computer system. The foregoing, and other variations of the exemplary embodiments described herein, will be appreciated by those of ordinary skill in the art.

Described herein are techniques that may be used in connection with a divide and merge methodology for clustering a set of objects. As mentioned above, the divide and merge methodology may also be used in combination with a preprocessing phase to generate weights for the different features associated with the objects of a data set. Although the preprocessing phase is illustrated in connection with the divide and merge methodology, the preprocessing phase may also be used in connection with other techniques. Additionally, an embodiment does not have to perform preprocessing and may perform the divide and merge phase processing without preprocessing.

Figure 1C:
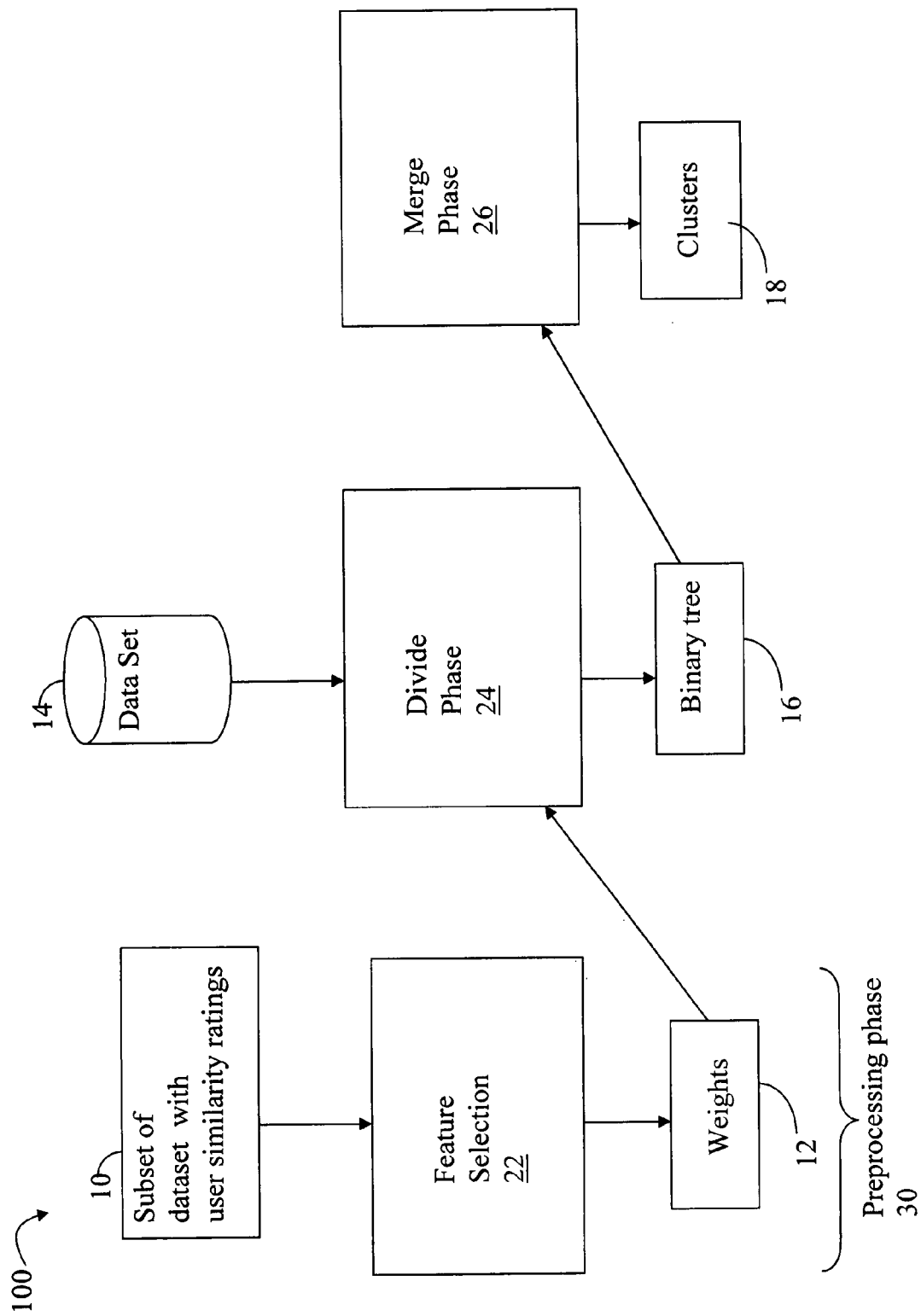
FIG. 1C is an example of functional components that may be used in connection with performing the techniques herein.

Referring now to FIG. 1C, shown is an example of components that may be included in an embodiment utilizing the techniques described herein. The example 100 illustrates a preprocessing phase 30, a divide phase 24 and a merge phase 26. The preprocessing phase, divide phase, and merge phase may be performed, respectively, by the modules 82, 84, and 86 of FIG. 1C. In this example, the optional preprocessing phase utilizes a feature selection component 22 to generate a set of weights 12 based on a subset of objects for which similarity ratings 10 are provided. The similarity ratings may be user-specified. The divide phase 24 uses the weights 12, which include a weight for each feature of an object, and the data set 14 as inputs. The divide phase 24 generates a binary tree 16 representing a hierarchical clustering of the data set of objects 14. The merge phase 26 takes as an input the binary tree 16 and performs bottom-up processing on the tree to determine one or more clusters or groups of similar objects in the data set as represented by clusters 18. Each of the clusters in 18 may include objects of the data set 14 which have been grouped together in accordance with specified criteria. For example, an embodiment may determine a configuration of clusters 18 which minimizes the degree of dissimilarity between objects in a same cluster and also minimizes the degree of similarity between objects of different clusters. Each of the foregoing phases, inputs and outputs, and criteria that may be included in an embodiment are described in more detail herein.

The data set 14 may be characterized as a set of objects. Each object has a set of features describing that object. For example, the data set 14 may include a collection of web pages that are text-based documents having features characterizing each web page. Features may include, for example, the different words in each page and the number of occurrences of each word. The data set 14 of objects that may be used in connection with the techniques described herein may vary. The techniques described herein may be used in connection with varying types of data sets 14 including, for example, medical data, financial data, images, and the like. Data sets of a same type may use the same features.

Figure 2:
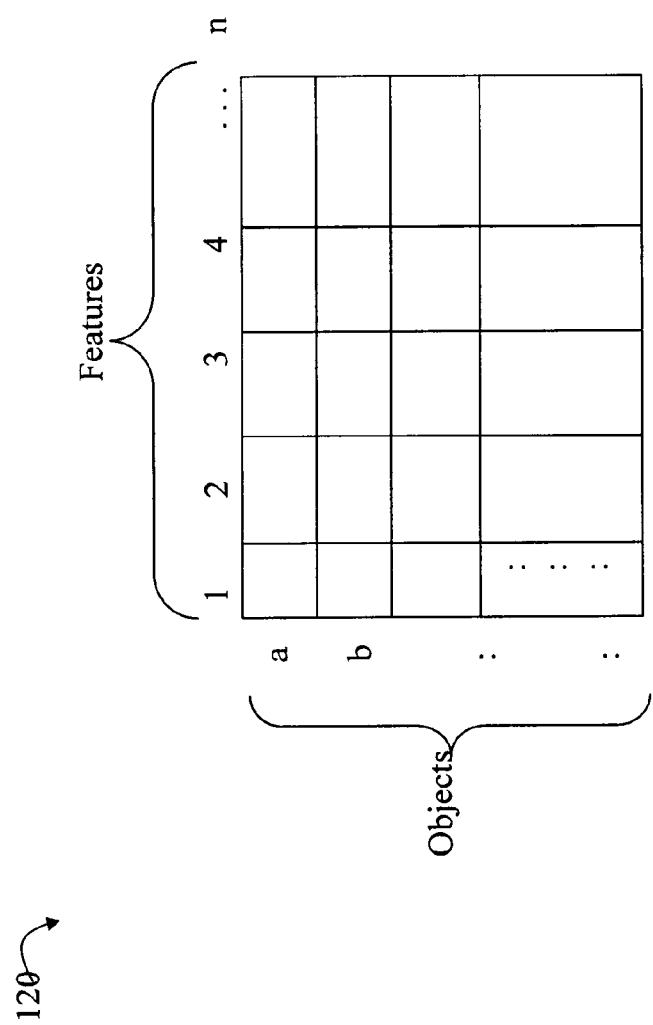
FIG. 2 is an example representation of features for a data set of objects.

Referring now to FIG. 2, shown is an example illustrating a representation of features for a data set of objects. In the example 120, a matrix may be used to represent the feature values of each object. Each row in the matrix includes a set of feature values for an object. Each column of the matrix represents values of the same feature for all objects in the data set. In the representation 120, there are n features for each object.

The preprocessing phase 30 may be used to determine weights for each of the features associated with an object. In one embodiment, a weight, denoted $w_i$ as the weight of the ith feature, can be a value between 0 and 1, inclusively. As described elsewhere herein in more detail, the weights may vary with the type of data set and may be recomputed for different data sets. A same set of weights may also be used in connection with the same data set as well as different data sets of the same type. A similarity function, S, may be used to determine a value representing a weighted degree of similarity between two objects, a and b, of a data set for n features:

$$S(a, b) = \sum_{i=1}^{n} a_i b_i w_i$$

where each $a_i$ and $b_i$ corresponds to the ith feature value of the associated object. The similarity S(a,b) may be determined using the above function as a product of the weights and the feature vectors for the objects a and b. With reference to FIG. 2, if the first row of the matrix in example 120 represents the feature vector for a and the second row represents the feature vector for b, then S(a,b) may be determined as the product:

$S(a,b)=(a_1, \ldots a_n)\cdot(b_1, \ldots, b_n)\cdot(w_1, \ldots, w_n).$
WEIGHTED SIMILARITY FUNCTION The preprocessing phase 30 may be used in determining the $w_i$'s for a data set. Each element in the feature vector may be a numerical value or rating with respect to the feature described by the element. In one embodiment, a subset of objects of the data set may be rated with a level of similarity, S, and used as an input in determining the weights in connection with preprocessing. For example, a user may determine a similarity rating, S, between each pair of objects in a selected subset of objects from the data set 14.

Figure 3:
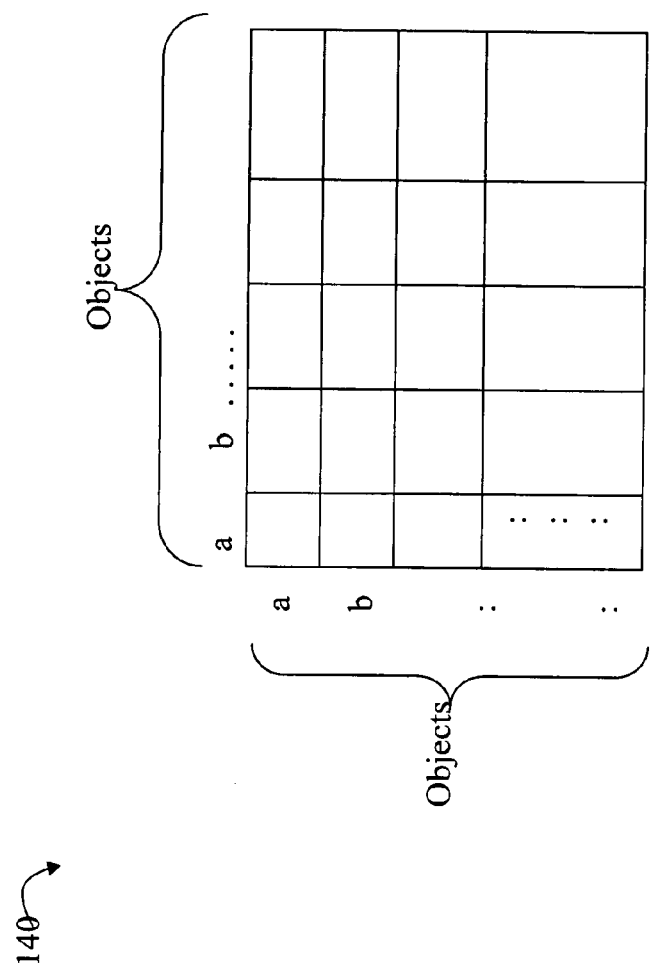
FIG. 3 is an example representation of the input that may be used in connection with the preprocessing phase.

Referring now to FIG. 3, shown is an example representation of the input 10 of FIG. 1C. A user may select a subset of objects from the data set 14. For this subset, the user may input a similarity value, S, for each pair of objects in the subset. In the example 140, an entry (g,h) in the user input matrix, wherein g=row identifier and h=column identifier for the entry, is the value of S representing the similarity between object g and object h in the subset of objects. It should be noted that the user input may be in a variety of different forms besides as illustrated in FIG. 3.

T may represent the matrix of user input similarities for the subset as illustrated in FIG. 3. The goal of preprocessing is to determine values for $(w_1, \ldots, w_n)$ so that the similarity function S (e.g., WEIGHTED SIMILARITY FUNCTION S above), is as close as possible to T. The goal of preprocessing may be represented as minimizing a function, F(W):

$$F(W) = \sum_{a,b} (S_{ab} - T_{ab})^2$$

over all possible values of $(w_1, \ldots, w_n)$. The summation is over all pairs of objects, a, b, in the subset.

What will now be described is a technique that may be used in connection with determining the weights by solving a system of linear equations as illustrated in FIG. 4. The example 160 includes an n×n matrix A 162, an n×1 vector 164, and an n×1 vector 166, where n is the number of features.

In the example 160, the unknown weights being solved for in the system of equations are represented by element 164. The values of the Matrix A 162 and the vector of constants 166 may be determined by taking the derivative of the function F(W) as set forth above for each $w_k$, with respect to $w_k$, k assuming values from 1 . . . n, inclusively, and setting the derivative of the function F(W) to 0 (zero). The foregoing may be represented as:

$$\frac{dF(W)}{dw_k} = 0$$

Taking the derivative of F(W) for each $w_k$ results in n equations, one for each $w_k$, and may be used to populate the kth row of A and the kth entry of the vector of constants 166.

Using the resulting linear system of equations as illustrated in the example 160, the weights 164 may be solved for using known techniques such as, for example, Gaussian elimination. Following is additional detail regarding the equations used in connection with the techniques herein for determining the weights.

The function F(W) from above is:

$$F(W) = \sum_{a,b} (S_{ab} - T_{ab})^2$$

Substituting the product of the weights and feature values for the similarity function S produces:

$$F(W) = \sum_{a,b} \left( \sum_{i=1}^{n} w_i a_i b_i - T_{ab} \right)^2$$

and now taking the derivative with respect to $w_k$, and setting that to 0 may be represented as:

$$\frac{dF(W)}{dw_k} = \sum_{a,b} 2 \left( \sum_{i=1}^{n} w_i a_i b_i - T_{ab} \right) a_k b_k = 0$$

This equation may be simplified as follows:

$$2\sum_{a,b} a_k b_k \left(\sum_{i=1}^{n} w_i a_i b_i - T_{ab}\right) = 0$$

$$\sum_{a,b} a_k b_k \left(\sum_{i=1}^{n} w_i a_i b_i - T_{ab}\right) = \sum_{a,b} a_k b_k T_{ab}$$

$$\sum_{i=1}^{n} w_i \left(\sum_{a,b} a_i a_k b_i b_k\right) = \sum_{a,b} a_k b_k T_{ab}$$

$$\sum_{i=1}^{n} w_i \left(\sum_{a} a_i a_k\right)\left(\sum_{b} b_i b_k\right) = \sum_{a,b} a_k b_k T_{ab}$$

where the right hand side of the above:

$$\sum_{a,b} a_k b_k T_{ab}$$

represents the kth entry of the vector of constants 166, $b_k$ and for:

$$\sum_{i=1}^{n} w_i \left(\sum_{a} a_i a_k\right)\left(\sum_{b} b_i b_k\right) \qquad \text{EQUATION A1}$$

each $a_i$ represents the ith feature value of object a, and each $b_i$ represents the ith feature value of object b, and each pair of values, $a_i, b_i$ in the above produces the ith entry in row k of the matrix A.

Note that the above EQUATION A1 may also be represented as:

$$\sum_{i=1}^{n} w_i \left(\sum_{a} a_i a_k\right)^2$$

because $$\sum_{a} a_i a_k$$

is the same as $$\sum_{b} b_i b_k.$$

Once the values for the matrix A 162 and the vector of constants 166 have been determined, the system of equations may be solved using, for example, Gaussian elimination. A variety of different programming routines and software packages may be used in connection with solving the system of linear equations such as, for example, MATLAB® by MathWorks.

The divide phase 24 is described in more detail in following paragraphs. As also described elsewhere herein, the phases 24 and 26 may be used alone, or in combination with, the preprocessing phase 30. In other words, the phases 24 and 26 may use features which are not weighted (e.g., without preprocessing phase 30) or weighted (e.g., with preprocessing phase 30). An embodiment using weights 12 also does not have to compute the weights with each execution of the phases 24 and 26. An embodiment may utilize a previously computed and stored set of weights for a particular data set of objects, such as documents. For example, an embodiment may determine weights for each of one or more varying types of data sets that may be used with phases 24 and 26. The weights may be determined offline from the divide phase 24 and merge phase 26. At some later point after multiple sets of weights for different data sets are determined, a selected one of the weights may be used in connection with the divide phase 24 and the merge phase 26 in accordance with the particular data set.

In one embodiment, the divide phase 24 takes as an input the data set 14. The input data set 14 may be represented in a variety of different forms. In one embodiment, the input data set 14 may be in the form of a matrix, A, similar to that as described in connection with FIG. 2 in which a row represents the features of a particular object. The row index corresponds to a particular object and the column index corresponds to one of the features for each object. Thus, the ith object may be denoted as a row vector of the matrix. As an additional input to what is described elsewhere herein, the divide phase 24 may also optionally take as an input the set of weights 12 as determined by the preprocessing phase 30. In an embodiment utilizing weights 12 generated by the optional preprocessing phase 30, the similarity function S of two objects, i and j, may be defined as a product of: the inner product of their term or feature vectors, Ai and Aj, and the corresponding weight for each of the features, as described elsewhere herein in connection with the preprocessing phase. In an embodiment not utilizing weights, the similarity function S of two objects, i and j, may be defined as the inner product of their term vectors, Ai and Aj. The similarity matrix may be represented as $AA^T$, in which $A^T$ represents the transpose of matrix A. The similarity matrix may also be characterized as a complete graph where the vertices are formed by the set of objects with edge weights corresponding to the similarity or weighted similarity between two vertices.

Figure 5:
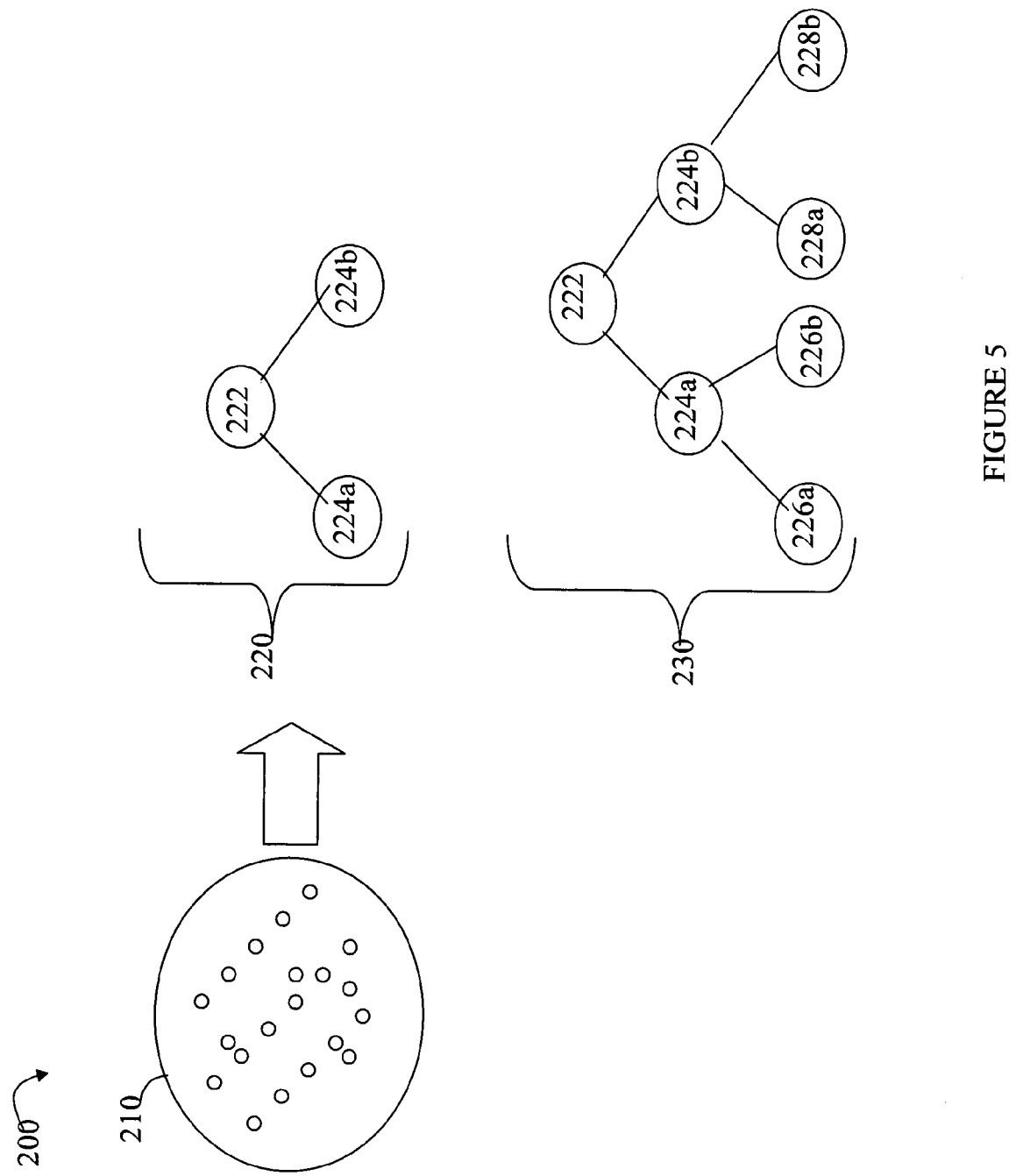
FIG. 5 is an example illustrating divide phase processing.

An example representation of divide phase 24 processing is illustrated in FIG. 5. In the example 200, a data set of objects 210 is repeatedly or recursively partitioned into two portions. In one embodiment, input data set 210 may be represented in a tree structure of 220 as objects of the root 222 of a tree. In a first instance, the divide phase 24 may partition all the objects of the root 222 into multiple pieces, such as two pieces 224a and 224b represented as left and right child nodes, respectively, of their parent node 222. Data associated with each of the nodes 224a and 224b corresponds to those objects included in each of the two pieces based on the partitioning. As represented in 230, each of the nodes 224a and 224b may be further partitioned in a next step into two portions. The process of repeatedly partitioning objects represented by a node of the tree into two pieces may continue until each leaf node corresponds to a single object in the data set. At the end of the divide phase 24, the resulting tree 16 of FIG. 1 may be characterized as a hierarchical clustering of the objects of the input data set 210. Following paragraphs set forth an exemplary embodiment of the divide phase 24 in which a set of objects of a node of the tree is recursively cut or divided using a spectral algorithm which makes use of the spectrum of the similarity matrix of the data to cluster data points. The cut or partitioning selected at each hierarchical level of the tree may be determined using a quantity called conductance to define a measure of good clustering based on the graph of pairwise similarities. As described above, the similarity of two objects is defined as the inner product of their respective feature vectors which may optionally be weighted in accordance with preprocessing. Conductance is described in following paragraphs and the cut selected at each hierarchical level is the cut having the smallest conductance.

It should be noted that a particular technique is described herein for illustrating the divide phase when the objects are represented using the matrix of FIG. 2 and the similarity between the objects is the inner product between the corresponding vectors. However, it will be appreciated by those skilled in the art that any one of a variety of different divisive techniques may be used to generate a tree whose leaves are the objects themselves and each of the non-leaf nodes of the tree represents a subset of the objects including the leaves in the subtree below.

In following paragraphs for purposes of illustration, reference may be made to an embodiment in which no weighting is performed.

What will be described is a graphical illustration of processing that may be performed in an embodiment to determine how to make a cut or partition the data elements included in a non-leaf node of the tree structure, for example, as illustrated in FIG. 5. As described above, the similarity matrix may also be characterized as a complete graph where the vertices are formed by the set of objects with edge weights corresponding to the similarity between two vertices.

Figure 6:
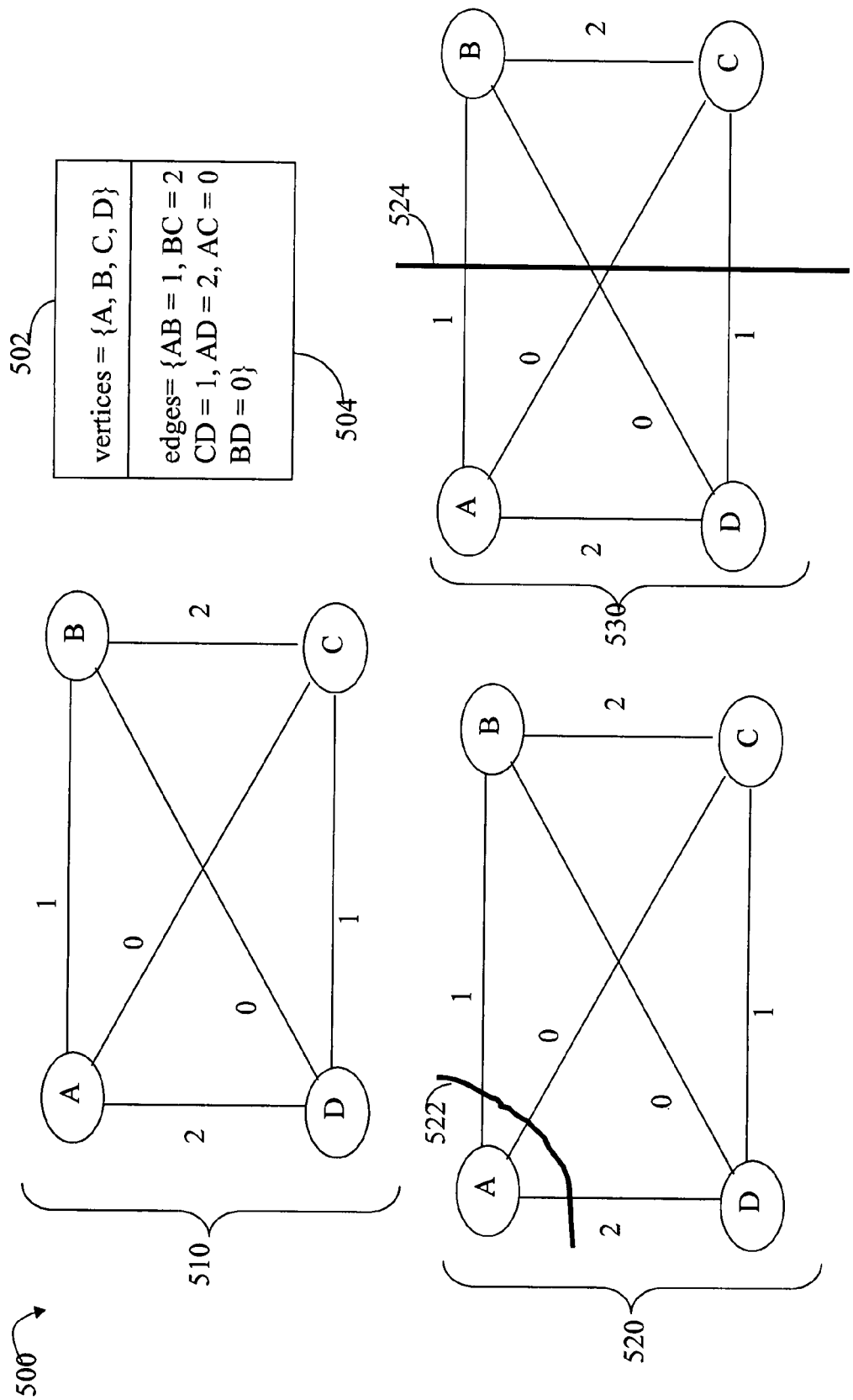
FIG. 6 is a graphical representation of a set of objects used in various processing steps of the techniques herein.

Referring now to FIG. 6, shown is a representation as a graph of a set of data objects that may be associated with the root of the tree. Element 510 is an example graphical representation including 4 vertices, A, B, C, and D, corresponding to 4 different objects as included in 502. The edge between any two vertices has an edge weight as indicated in 504 representing the similarity between the objects corresponding to the two vertices. The similarity may be determined as described above. It should be noted that elements 520 and 530 are utilized in connection with illustrating further processing steps.

Processing may be performed using techniques herein to determine how to cut or partition the set of data objects of 510 into two partitions or pieces. In connection with 510 of FIG. 6, seven (7) different partitionings or cuts are possible as indicated in FIG. 7. In connection with techniques herein, a quantity called conductance may be determined for each partitioning or cut. The conductance may be represented as:

$$\text{EQUATION 2} \quad \frac{\text{sum of the weights for edges across the cut}}{\text{minimum(size of partition 1, size of partition 2)}}$$

The numerator of EQUATION 2 may be determined by adding the edge weights of all the edges which cross the cut. The denominator is represented as the minimum or smallest size of each of the partitions.

Referring to FIG. 7, consider the first row 552 of the example 550 in which a first partition consists of A and the second partition consists of BCD. With reference to element 520 FIG. 6, a cut 522 may be made representing the partitioning of the first row 552 to segregate A into a grouping separate from BCD. With this cut, the numerator of EQUATION 2 evaluates to 3 and the denominator evaluates to 1 since the size of the smallest partition is 1 (e.g., partition 1 including element A). The conductance as represented in EQUATION 2 may be determined for each partitioning or cut having values indicated in the third column of table 550 of FIG. 7.

In accordance with techniques herein, the cut that minimizes the conductance is selected. With reference to FIG. 7, the row 554 has the smallest conductance and is graphically represented in 530 of FIG. 6. The partitioning as represented by row 554 is selected as the partitioning of the vertices. With reference to a tree structure, vertices A, B, C and D may represent objects in a node, such as the root node 222 of FIG. 5. The selection of the cut corresponding to row 554 results in the generation of 2 children (224a and 224b) of the root in which the left child includes AB and the right child includes CD. Subsequently determining the cut which has the minimum conductance value is determined for each of the children of the root node may be recursively performed for each grouping of vertices included in a tree node until the nodes each contain a single vertex (e.g., object).

Figure 8:
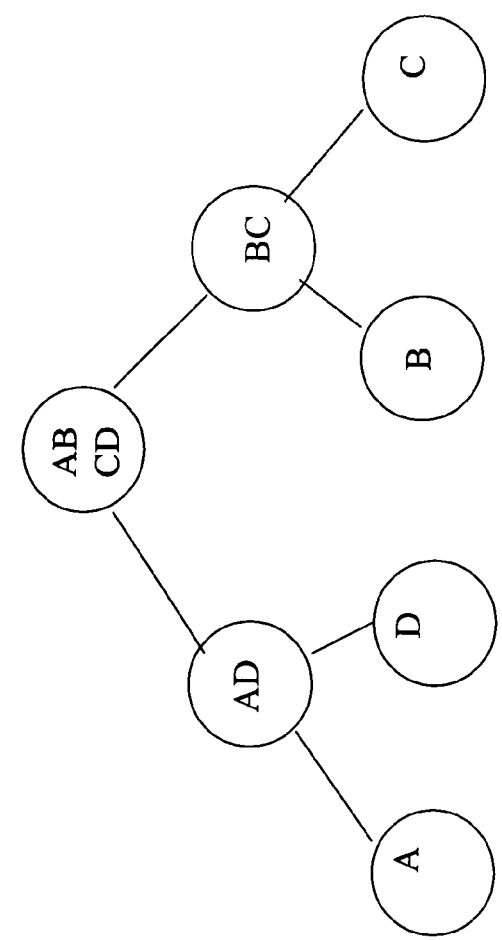
FIG. 8 is an example representation of a clustering of objects as may be generated as a result of divide phase processing.

Referring now to FIG. 8, shown is an example 600 of a tree representation formed by selecting a cut among data elements of each non-leaf node having a minimum conductance value as determined in accordance with EQUATION 2.

EQUATION 2 may be formally represented as finding a cut for a set of n data elements such that the cut partitions the n data elements into two partitions S and T:

$$(S,T)=(\{1,\ldots,t\},\{t+1,\ldots,n\})$$

that minimizes the conductance:

$$\phi(S,T) = \frac{c(S,T)}{\min(c(S), c(T))}$$

wherein c(S,T) is the sum of the edge weights across the cut represented as:

$$c(S,T) = \Sigma_{i \in S, j \in T} A_i \cdot A_j,$$

Ai and Aj corresponding to the term vectors for objects i and j, and wherein c(X) represents the size or number of vertices in the set X.

It should be noted that the foregoing determination of a conductance value for each possible cut may become impractical to compute as the number of data elements or objects increases since the computation time scales exponentially with respect to the number of objects.

As a result, techniques may be used to approximate the best cut in accordance with the conductance. As will be described in following paragraphs, the cut may be determined by computing v, an approximation of the second largest eigenvector of the similarity matrix, $AA^T$ normalized so that all row sums are 1. The ordering of the objects in v gives a set of "n−1" cuts, n being the number of objects, and the best of these cuts is selected based on the minimal conductance value. The foregoing may be performed recursively on each of the partitions determined for the selected cut. To compute the approximation of the second eigenvector, the power method may be used. As known in the art, the power method is an iterative technique for which it is not necessary to compute the normalized similarity matrix which converges to the second largest eigenvector.

Figure 9:
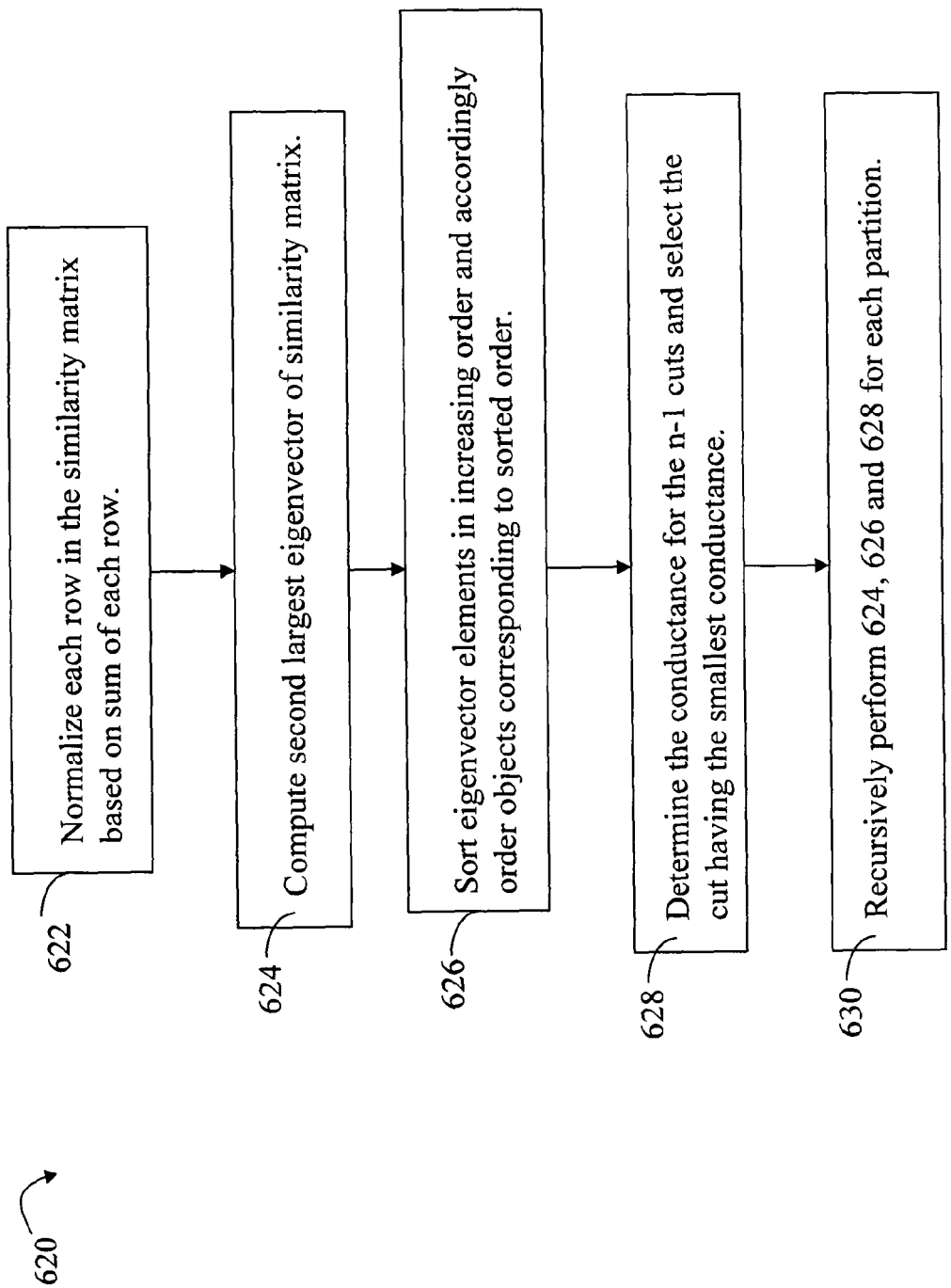
FIGS. 9 and 10 are flowcharts of processing steps that may be performed in an embodiment in performing divide phase processing.

Referring now to FIG. 9, shown is a flowchart of processing steps that may be performed in an embodiment using the techniques herein for generating the output of the divide phase. As described elsewhere herein, the output of the divide phase in one exemplary embodiment may be a tree in which each leaf node corresponds to a single object in the data set. The steps of 620 repeatedly partitioning each non-leaf node in the tree. It should be noted that more detailed processing of the steps of 620 are described in following paragraphs. At step 622, each row of the similarity matrix, $AA^T$, is normalized based on the sum of each row. Each element in a row in the similarity matrix is divided by the sum of the elements in the row. As a result, each row of the normalized similarity matrix sums to 1. At step 624, the second largest eigenvector is computed for the similarity matrix. As described in following paragraphs, the power method may be used to approximate the second largest eigenvector. At step 626, the elements of the eigenvector are sorted in increasing order. The objects corresponding to each element in the eigenvector are also accordingly ordered and used in forming the subset of possible cuts for evaluation. The ordering of the objects forms a sequence of n−1 cuts for which the conductance value is determined in step 628. For example, if the objects corresponding to the sorted eigenvector elements are ACBD, the conductance is determined for the following "n−1" cuts, n=4, forming 2 partitions:

| Partition 1 | Partition 2 |
|---|---|
| A | CBD |
| AC | BD |
| ACB | D |

The foregoing processing reduces the number of cuts that are evaluated in step 628. At step 630 steps 624, 626 and 628 may be recursively performed for each partition of the selected best cut in step 628.

It should be noted that conductance is only one criterion that may be used for selecting the best cut when repeatedly dividing objects of a node. An embodiment may utilize other criterion/criteria and other processing steps to repeatedly divide a data set to form the tree structure or other hierarchical representation of the objects of the data set.

Figure 10:
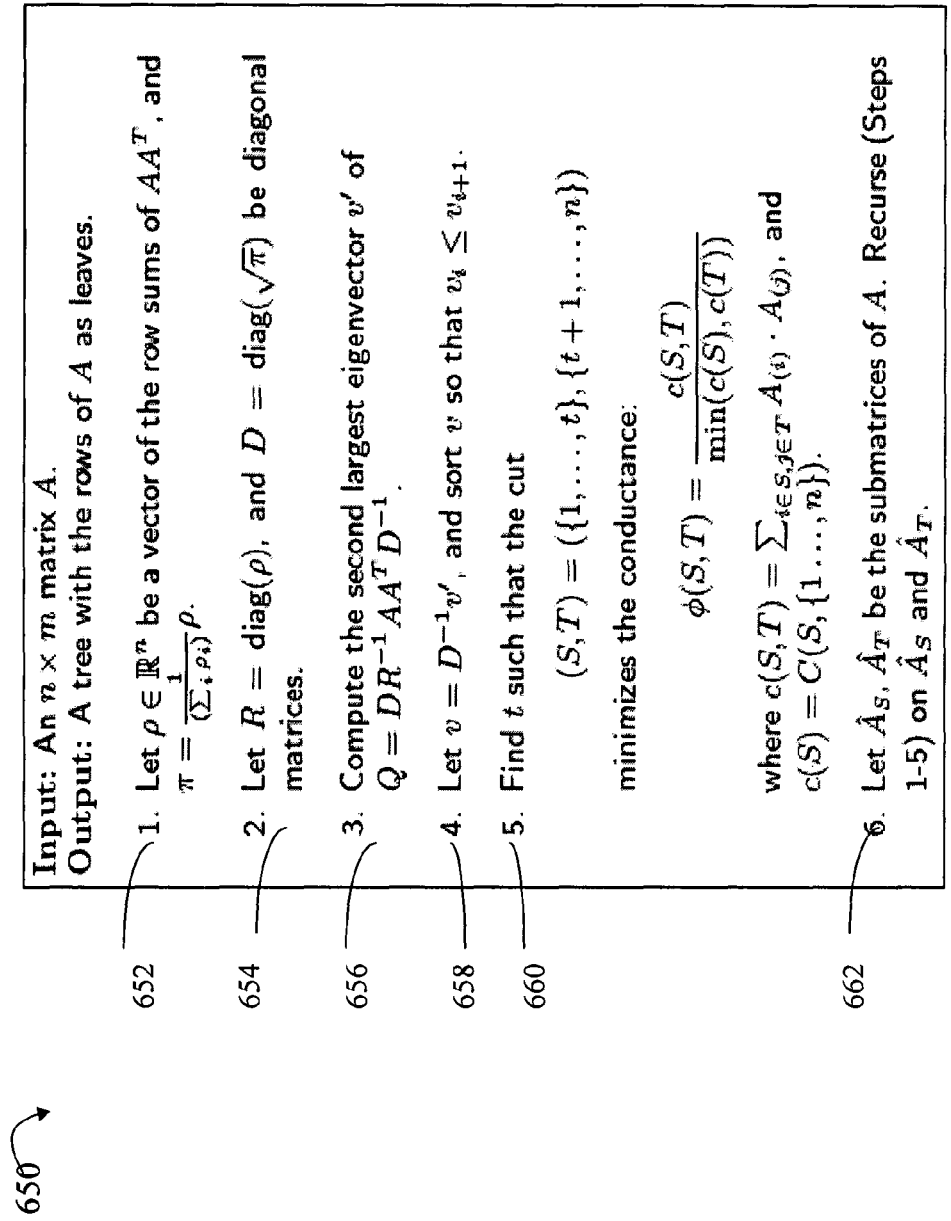

Referring now to FIG. 10, shown is a flowchart 650 of more detailed processing steps that may be performed in an embodiment using the techniques herein for generating the output of the divide phase. Flowchart 650 may be characterized as a more detailed implementation of the steps of FIG. 9. As part of normalizing the similarity matrix, steps 652 and 654 are performed. At step 652, let $\rho \in \mathfrak{R}^n$ be a vector of the row sums of the similarity matrix, $AA^T$, and let $$\pi = \frac{1}{\left(\sum_i \rho\right)} \rho$$

Each row $\rho i$ of the matrix $\rho$ may be represented as:

$$\sum_{j=1}^n A_i \cdot A_j = \sum_{j=1}^n \sum_{k=1}^m A_{ik} A_{jk} = \sum_{k=1}^m A_{ik} \left(\sum_{j=1}^n A_{jk}\right)$$

Because $$\sum_{j=1}^n A_{jk}$$

does not depend on i, $$u = \sum_{i=1}^n A_i$$

can be determined so that $\rho_i = A_i \cdot u$ may be computed for each row. The computation of u in this case makes one pass over the non-zero entries of A. Each dot product to compute each $\rho_i$ takes time proportional to the non-zero entries in Ai.

At step 654, $R=\text{diag}(\rho)$ and $D=\text{diag}(\sqrt{\pi})$ wherein R and D are diagonal matrices. $R_{ii}=\rho_i$ and $D_{ii}=\sqrt{\pi_i}$. Observe that:

$$\rho_i = \sum_{j=1}^n A_i \cdot A_j = \sum_{j=1}^n \sum_{k=1}^m A_{ik} A_{jk} = \sum_{k=1}^m A_{ik} \left(\sum_{j=1}^n A_{jk}\right)$$

Because $$\sum_{j=1}^n A_{jk}$$

does not depend on i, u can be determined as $$u = \sum_{i=1}^n A_i$$

so that $\rho_i = A_i \cdot u$ making the total running time of O(M).

At step 656, the second largest eigenvector v' of the following matrix Q is determined:

$$Q = DR^{-1}AA^T D^{-1}$$

In one embodiment, the power method may be used to approximate the second largest eigenvector since the power method converges to the second largest eigenvector. The matrix Q is symmetric and therefore, using the power method, Q may be iteratively determined using matrix-vector multiplication. As known in the art, the power method is an iterative technique. The power method is described, for example, in Howard Anton, "Elementary Linear Algebra", Third Edition, John Wiley & Sons, Inc., 1981.

The power method for use herein may be summarized as follows:
1. Construct a random n-dimensional vector v'
2. Make v orthogonal to $\pi^T D^{-1}$.
3. Normalize v' by setting v'=v'/|v'|, wherein |v'| refers to the size of the vector v'.
4. Set v'=Qv' and repeat steps 2-4.

It should be noted that the repetition of steps 2-4 in the foregoing power method may be performed O(log n) times since the iterative power method technique will converge within this time. Step 2 ensures that the vector computed is the second largest eigenvector. As known in the art, the second largest eigenvector is orthogonal to the largest eigenvector. As such, the power method is performed with a starting vector chosen uniformly over vectors orthogonal to the top or left eigenvector, $\pi^T D^{-1}$ with an eigenvalue of 1, and the power method converges to the second largest eigenvector.

It should be noted that in practice, the representation of objects as row vectors in the matrix A may be sparse having many more zeroes than non-zero entries so that an embodiment may perform calculations in connection with processing steps herein using sparse matrix multiplications. For example, performing step 3 (e.g., normalize) and step 4 above for setting v'=Qv' may be performed using four sparse vector matrix multiplications as follows represented as follows:

$v':=D^{-1}v'$;
$v':=A^t v'$
$v':=Av'$
$v':=DR^{-1}v'$, where R is the diagonal matrix.

At step 658, $v=D^{-1}v'$, wherein v' is the second largest eigenvector from step 656. Also as part of step 658, the vector v is sorted in increasing order so that $v_i \leq v_{i+1}$. Based on this sorted ordering, in step 660 a sequential ordering of corresponding objects is specified indicating a set of n−1 cuts to be considered. If $v_1 \ldots v_n$ represents the ordering of the elements of the vector v, then we want to find the value t that minimizes the conductance of the cut:

$$(S,T) = (\{v_1, \ldots, v_t\}, \{v_{t+1}, \ldots, v_n\})$$

for data elements or objects (e.g., rows of the matrix A) corresponding to each $v_i$.

In connection with calculating the conductance, for example, as represented using EQUATION 2, associated with each of the n−1 cuts of a vector entry $v_i$, the numerator portion of the conductance may be represented as $u_i$ and the denominator portion may be represented as $l_i$. The numerator portion for the ith element may be calculated based on the preceding numerator portion for the i−1$^{st}$ element.

The conductance may be represented as:

$$\phi(\{1, \ldots i\}, \{i+1, \ldots, n\}) = \frac{\sum_{k=1}^{i} \sum_{j=i+1}^{n} A_k \cdot A_j}{\min\left(\sum_{k=1}^{i} \rho_k, \sum_{k=i+1}^{n} \rho_k\right)}$$

with the numerator portion being $u_i$ and the denominator portion represented as $l_i$. Each $u_i$ and $l_i$ may be computed using preceding values, respectively, using $u_{i-1}$ and $l_{i-1}$.

Let $x_i = A_1 + \ldots + A_i$ where each $A_i$ represents a row vector of matrix A.

Let $y_i = A_{i+1} + \ldots + A_n$, and then $u_1 = x_1 \cdot y_1$ and
$u_i = (x_{i-1} + A_i) \cdot (y_{i-1} - A_i) = u_{i-1} - x_{i-1} \cdot A_i + y_{i-1} \cdot A_i + A_i \cdot A_i$ The denominator may be similarly computed for the n−1 cuts with a single pass through matrix A so that computation time is O(M).

Once the cut having the minimum conductance for the n−1 cuts considered in step 660 is determined, control proceeds to step 662 to accordingly partition the current set of data elements into two sets S and T and proceed with recursively performing processing of steps 652, 654, 656, 658 and 660 on each of these partitions. Execution of step 662 may be performed recursively using submatrices of A for each partition. The recursive processing may be performed until a submatrix contains only a single row indicating a leaf node of a single object. As such, the processing may complete with a tree resulting from the recursion representing a complete hierarchical clustering of the rows of A.

As described herein, an embodiment may perform sparse matrix calculations so that the techniques herein may execute in linear time.

Once the divide phase processing has completed generating a tree, for example, as illustrated in FIG. 8, the merge phase is performed. The merge phase is described in more detail in following paragraphs.

Referring back to FIG. 1C, the merge phase 26 finds a clustering for nodes of the tree 16 produced by the divide phase 24. The merge phase 26 may be characterized as performing a bottom-up processing or traversal of nodes in the tree 16 using dynamic programming techniques in which clustering for the leaf nodes is performed first and then for interior nodes of the tree 16. The merge phase determines the clusters starting with each leaf node of the tree 16 in its own cluster and merges clusters going up the tree from the leaves to the root. The final clusters form the partitioning or clusters 18 of the data set 14. In one embodiment using the dynamic programming techniques described herein, optimal clustering may be determined for the leaf nodes first and then for the interior nodes. Optimal clustering determinations may be made in accordance with criteria including one or more selected objective functions as well as other criteria, such as, for example specifying an upper bound on the number of clusters for the solution set. Any one of a variety of different objective functions may be used. Described in following paragraphs are criteria including several objective functions that may be used in an embodiment although an embodiment may also utilize other objective functions than as described herein. The objective function(s) may be used in evaluating the clustering options, for example, to determine a number of clusters as well as the "best" or optimal clustering of objects in accordance with the particular objective function.

Figure 11:
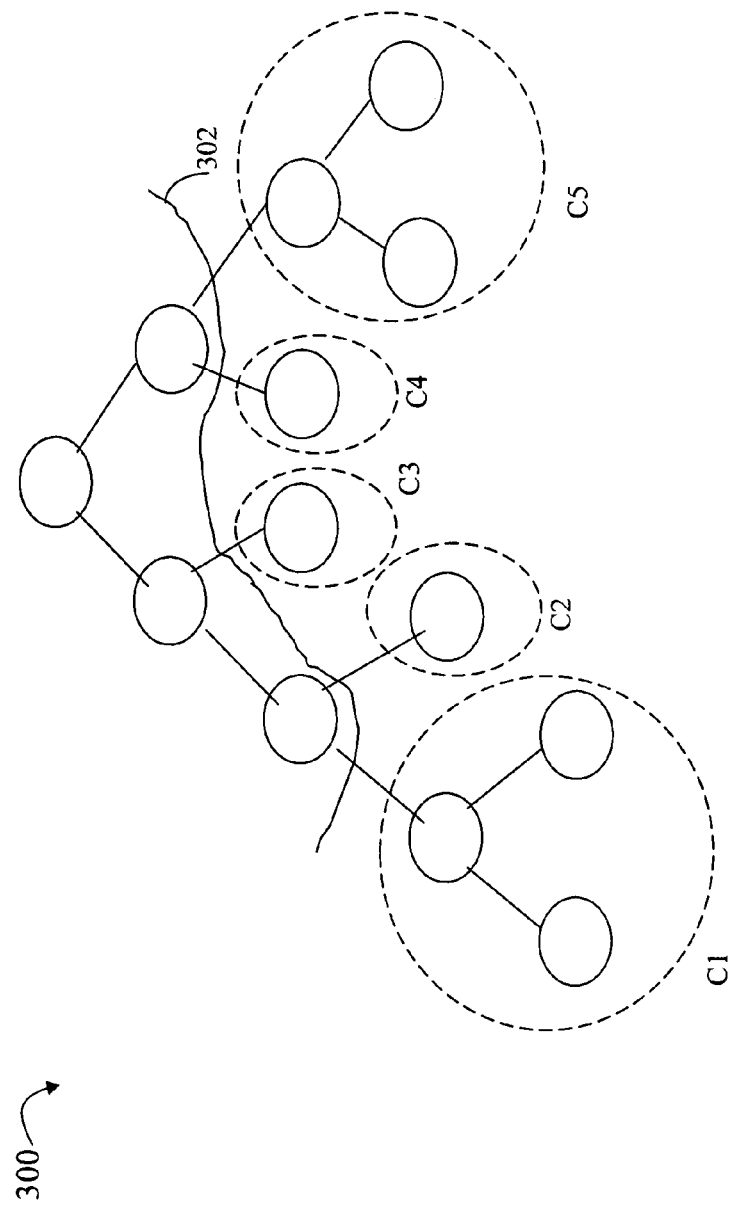
FIG. 11 is an example illustrating a tree representation that may be generated as an output of the merge phase processing.

Referring now to FIG. 11, shown is an example 300 of a tree as may be generated as a result of the merge phase 26. The tree in the example 300 may be partitioned into clusters in accordance with line 302. The merge phase 26 determines where to draw a line, such as 302, which determines the "best" possible clusters of proper disjoint subtrees of the tree 300. In other words, the merge phase determines the best way to group or form clusters from the clusters determined in the divide phase as reflected in the tree. In this example 300, there are 5 clusters determined as labeled C1-C5 in accordance with line 302. Processing of the merge phase 26 may determine a number of clusters (e.g., 5 as in example 300) as well as the objects in each cluster in accordance with the hierarchical clustering structure produced by the divide phase. As described in more detail in following paragraphs and elsewhere herein, the number of clusters determined may be in accordance with criteria including a specified upper bound.

Figure 11A:
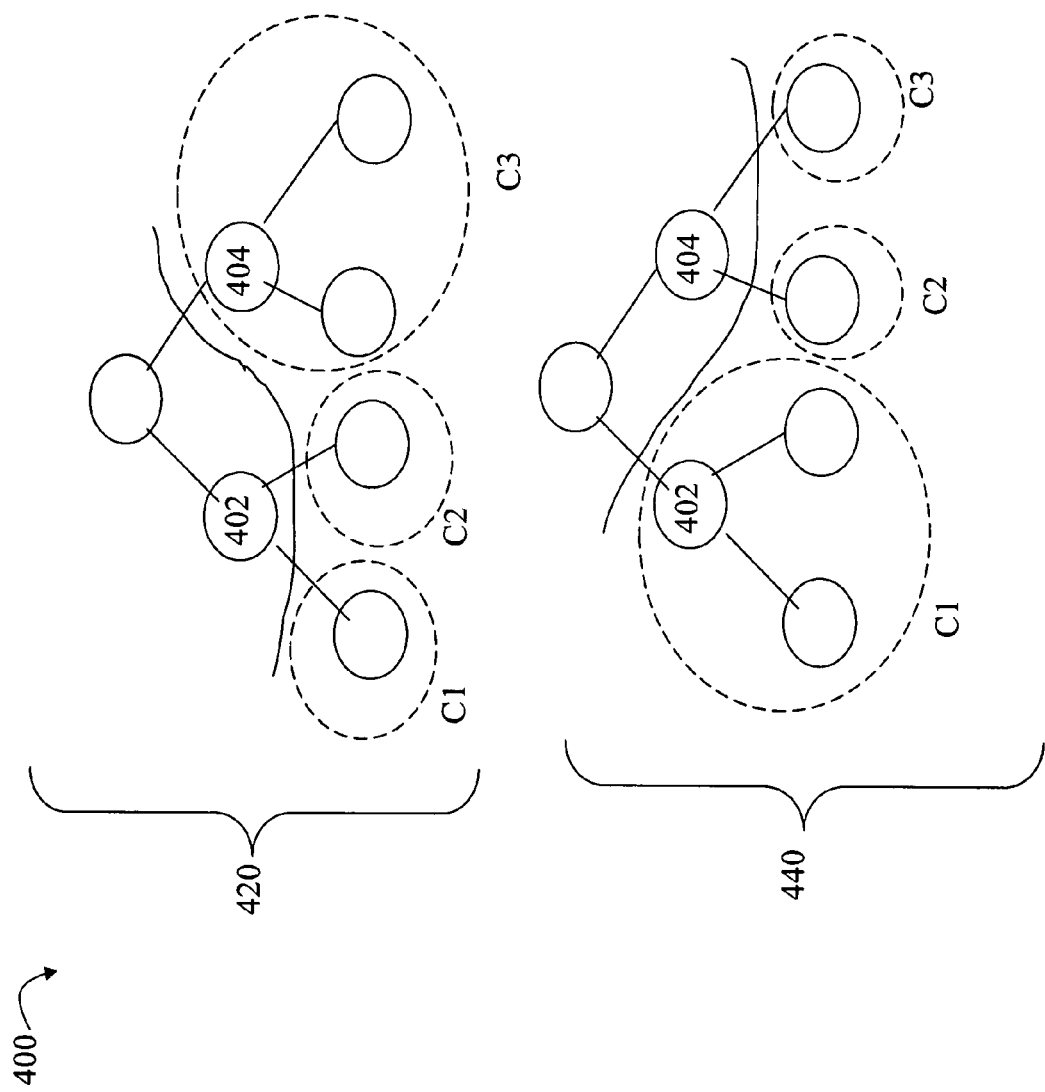
FIG. 11A is an example illustrating use of the merge phase processing techniques described herein in which clustering configuration options may be evaluated in accordance with an objective function.

Referring now to FIG. 11A, shown is a further example illustrating use of the merge techniques described herein in which clustering configuration options may be evaluated in accordance with an objective function. In the example 400, let there be a specified upper bound of 3 clusters and a single objective function. The objective function is evaluated in connection with a subtree having node 402 as a root forming 1 cluster (e.g., entire subtree is 1 cluster) and also for 2 clusters (e.g., right child of 402 is one cluster and left child of 402 is second cluster). Similarly, the objective function is evaluated in connection with a subtree having node 404 as a root forming 1 cluster and also for 2 clusters. The objective function is also evaluated in connection with the root node forming 1 cluster (e.g., entire tree is 1 cluster) and 2 clusters (e.g., right child of root is one cluster and left child of root is second cluster). Once the foregoing has been determined, a determination is made to select both the number of clusters and the partitioning of objects into particular clusters in accordance with the objective function. In this example, let an objective function value be determined for each cluster and let a rating of a configuration be determined as a sum of the objective function values for each cluster in the configuration. In this example, assume that configurations for partitioning the entire tree into 3 clusters are more optimal (e.g., have higher sums) than configurations for partitioning the entire tree into 1 and 2 clusters. Element 420 illustrates one possible partitioning of the tree into 3 clusters, and element 440 illustrates the other possible partitioning of the tree into 3 clusters. The objective function values determined for each of C1, C2 and C3 in 420 and 440 may be used in selecting the "best" illustrated partitioning of the entire tree into 3 clusters by determining which configuration (e.g., 420 or 440) has the maximum sum of objective function values for the clusters C1, C2 and C3 therein. The foregoing example may be characterized as relatively simplistic to illustrate use of the objective function in determining an optimal clustering in accordance with specified criteria or constraints. In the foregoing example, the constraints or criteria include an upper bound on the number of clusters and an objective function although, as described herein, others may utilized in an embodiment.

In accordance with techniques herein, criteria used in determining an optimal clustering configuration may include any of a variety of different standard objective functions known in the art. In connection with the merge phase processing, dynamic programming techniques may be used to compute the optimal clustering for a tree for a given objective function. As will be described in following paragraphs, existing techniques known in the art may be used to compute the optimal clustering for selected objective functions using dynamic programming.

Dynamic programming is a technique or class of solution methods for solving a problem exhibiting a particular property in that subproblems have optimal solutions that can be used to then find optimal solutions of the overall problem. A classic example of a problem which may be solved using dynamic programming techniques is the shortest path problem. Using dynamic programming techniques, the problem may be broken down into smaller subproblems and optimal solutions determined for the subproblems. Subsequently, these optimal subproblem solutions may be used to construct an optimal solution for the original problem. As known in the art, recursive programming techniques may be used to compute such solutions.

In connection with techniques herein, a bottom-up dynamic programming technique may be used for one or more objective functions included as criteria for determining the optimal clustering configuration. An example of the merge processing will now be described with reference to the tree of FIG. 8 and the associated edge weights of 504 of FIG. 6 using a particular objective function. However, the particulars of this example are for purposes of illustration of the techniques herein and should be construed as a limitation.

For the merge phase, we want to determine a clustering configuration that minimizes or maximizes, as appropriate, a selected objective function used with the binary tree output by the divide phase. With reference to FIG. 8, merge processing starts at the leaf nodes in the tree and considers clustering options while progressing up the tree to the root node. For this example, consider criteria based on two parameter values. An embodiment may use a first parameter, k, specifying an upper bound on the number of clusters to be formed, and a second parameter specifying an objective function to be used in evaluating each clustering configuration. The first parameter, k, may indicate that the hierarchical clustering (e.g., such as the binary tree) produced as an output of the divide phase may be partitioned by the merge phase into no more than k clusters. The second parameter, the objective function, may be used in evaluating the different clustering configurations for each of the no more than k clusters. For each interior (e.g., non-leaf) node, the best possible clustering configuration of the subtree formed with the interior node as the subtree root is determined when the subtree is partitioned into 1 cluster (e.g., entire subtree as 1 cluster), 2 clusters (e.g., 2 clusters formed for each of the left and right children of the interior node), and so on, up to at most k clusters. The best possible clustering configuration for each of the number of clusters (e.g., 1 . . . k) is determined using the objective function. Using the foregoing information, the merge phase determines the best clustering configuration in which the tree is partitioned into no more than k clusters. For this example, in addition to specifying an upper bound on the number of k clusters, let the objective function be to select the clustering option which maximizes the sum of the edge weights (e.g., similarities expressed previously as the edge weights) within each cluster. The objective function value for a given cluster configuration may be determined by adding the edge weights of the edges in each of the clusters being considered (e.g., weights of those edges having endpoints in the same cluster). Processing is performed at each level in the tree where the best clustering configurations and associated objective function values are maintained for each value of k. In this example, k=3 is the maximum or upper bound on the number of clusters.

Reference will now be made to FIGS. 12-16 in connection with performing the merge phase processing using the tree structure of FIG. 8 as may be generated by the divide phase.

Referring back to FIG. 8 and starting at the leaf nodes, clustering configurations are determined for possible values of k which is k=1 since there is only one possible clustering option at the leaf nodes. With reference to corresponding edge weights in 504 of FIG. 6, the objective function value is 0 for each of the four leaf nodes (e.g., A, B, C, D).

At the next level up in the tree examining the parent nodes AD and BC, possible values for k indicating a number of clusters are k=1 or 2.

Figure 12:
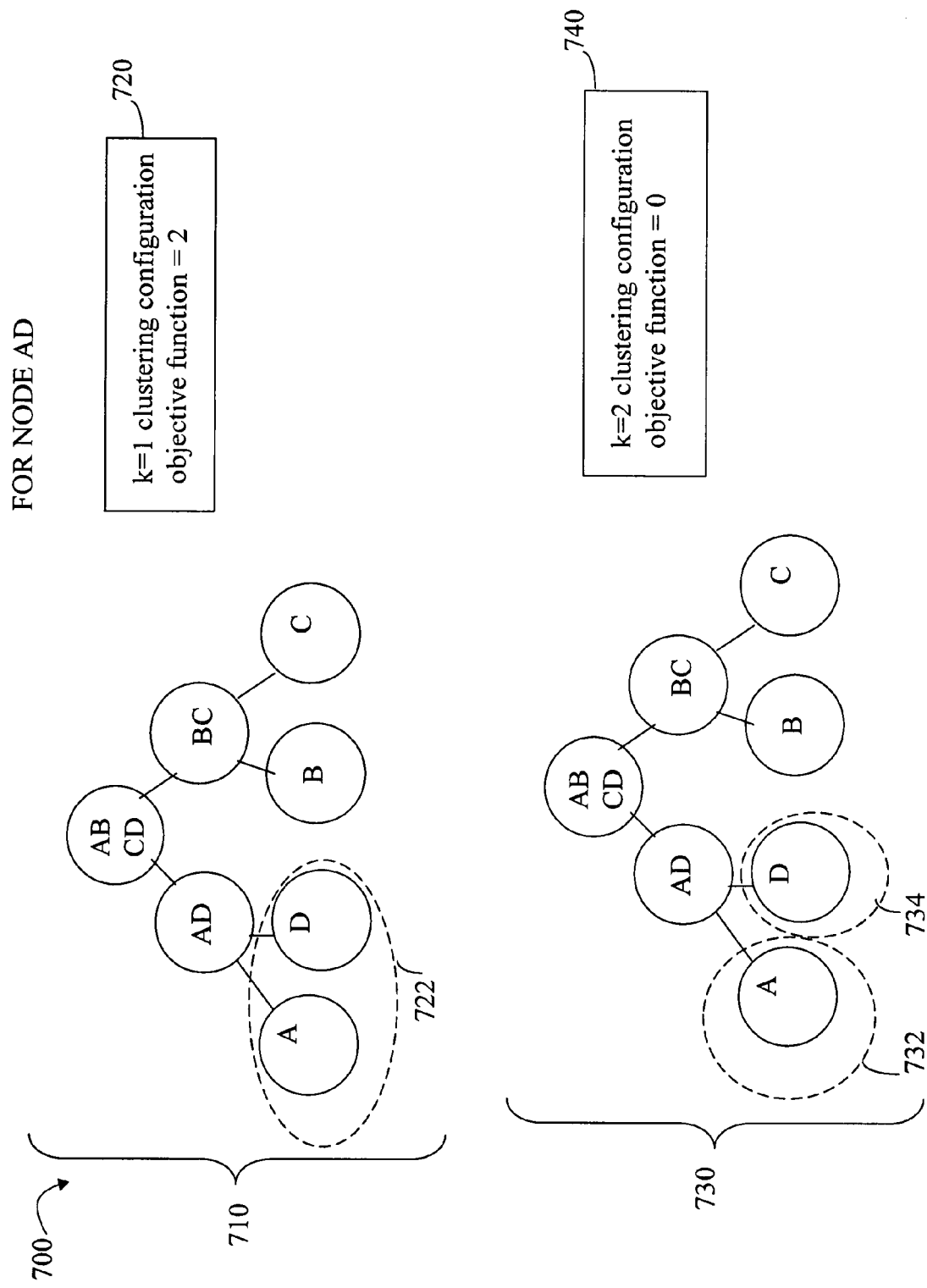
FIGS. 12-16 illustrate processing steps that may be performed in connection with merge processing using the tree of FIG. 8 as generated by the divide phase.

Referring now to FIG. 12, shown is an example illustrating clustering configuration options evaluated for node AD. With reference to node AD in 710, k=1 keeps A and D in the same cluster and k=2 is a configuration in which each A and D are in separate clusters. Similar configurations are possible for the node BC. In connection with the node AD for k=1 as illustrated by 722, the objective function is the edge weight of AD=2 as included in 720. With node AD for k=2 illustrated in 730 with two clusters 732 and 734, the objective function evaluates to 0 as included in 740 since there are no edges within each of the two clusters (e.g., each cluster is a single node or vertex). The value of the objective function for AD, k=2 can be determined using previously computed values from the child nodes A and D.

Figure 13:
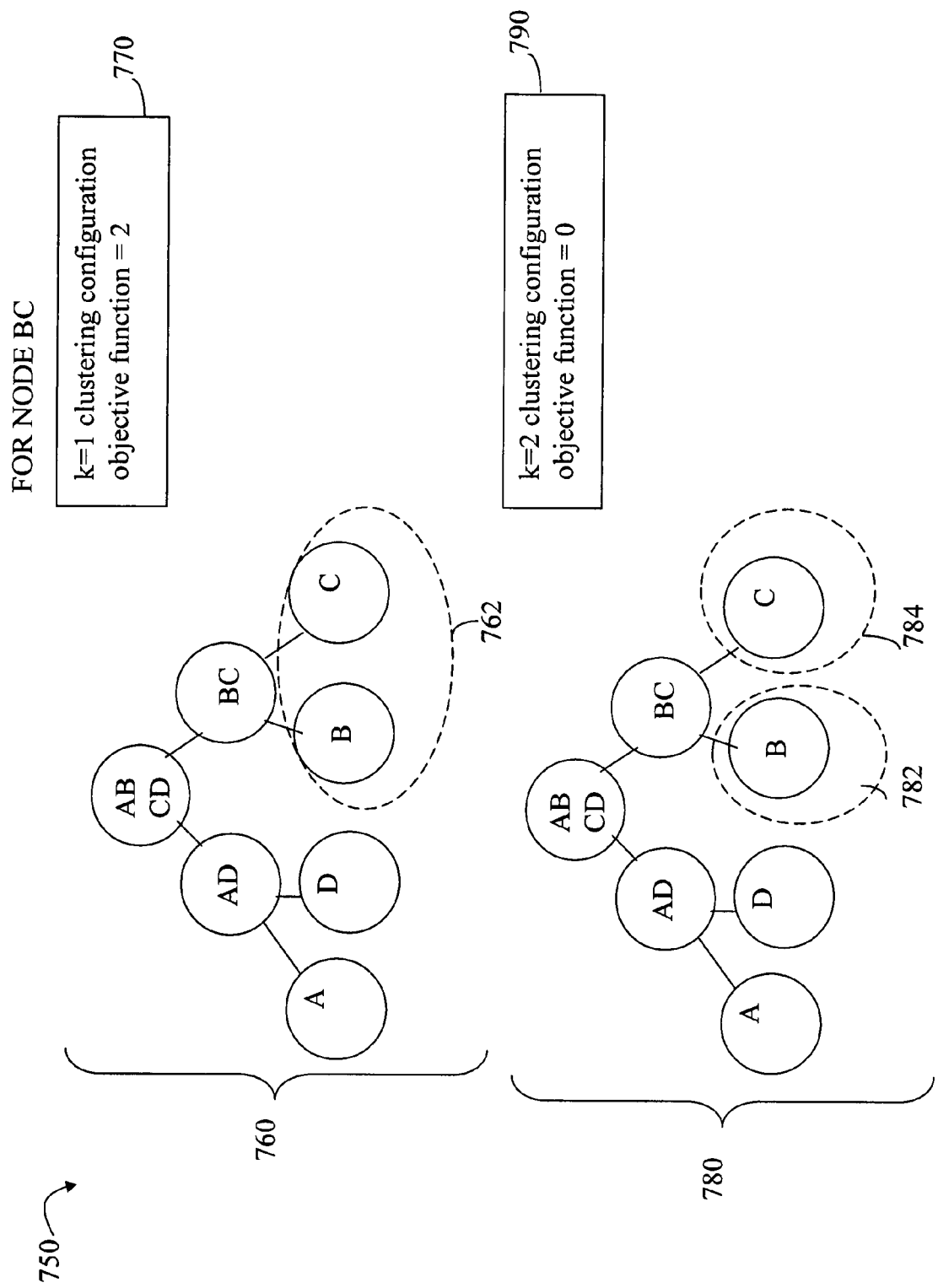

Referring now to FIG. 13, shown is an example illustrating clustering configuration options evaluated for node BC. As illustrated in 760 in connection with node BC for k=1, the single cluster 762 is considered having the objective function value=the edge weight of BC=2 (as included in 770). As illustrated in 780 with node BC for k=2 with the 2 clusters 782 and 784, the objective function evaluates to 0 since there are no edges within teach of the two clusters (e.g., each cluster consists of a single node or vertex. The objective function value is included in 790). The value of the objective function for node BC, k=2 can be determined using previously computed values from the child nodes B and D.

Figure 14:
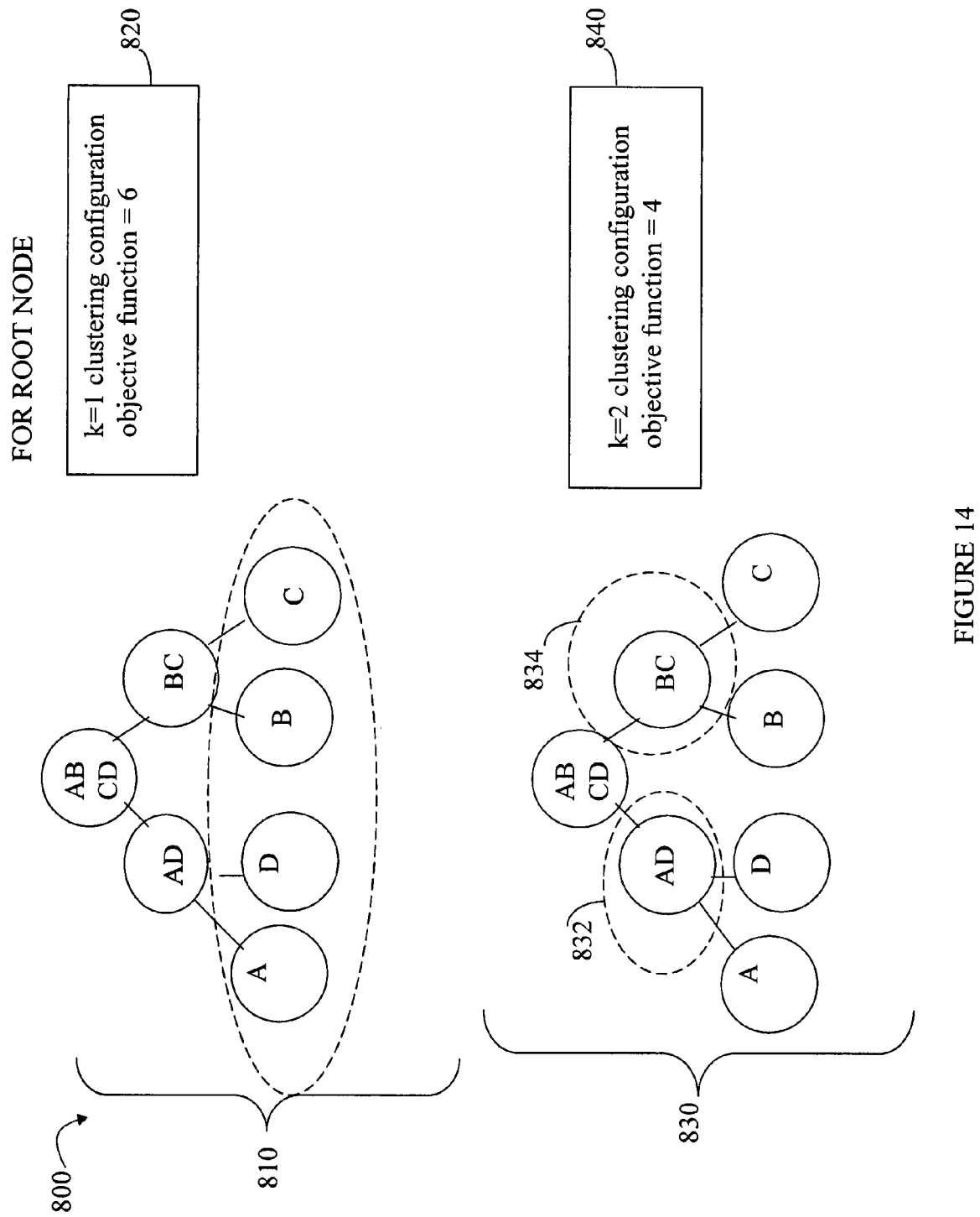
Figure 15:
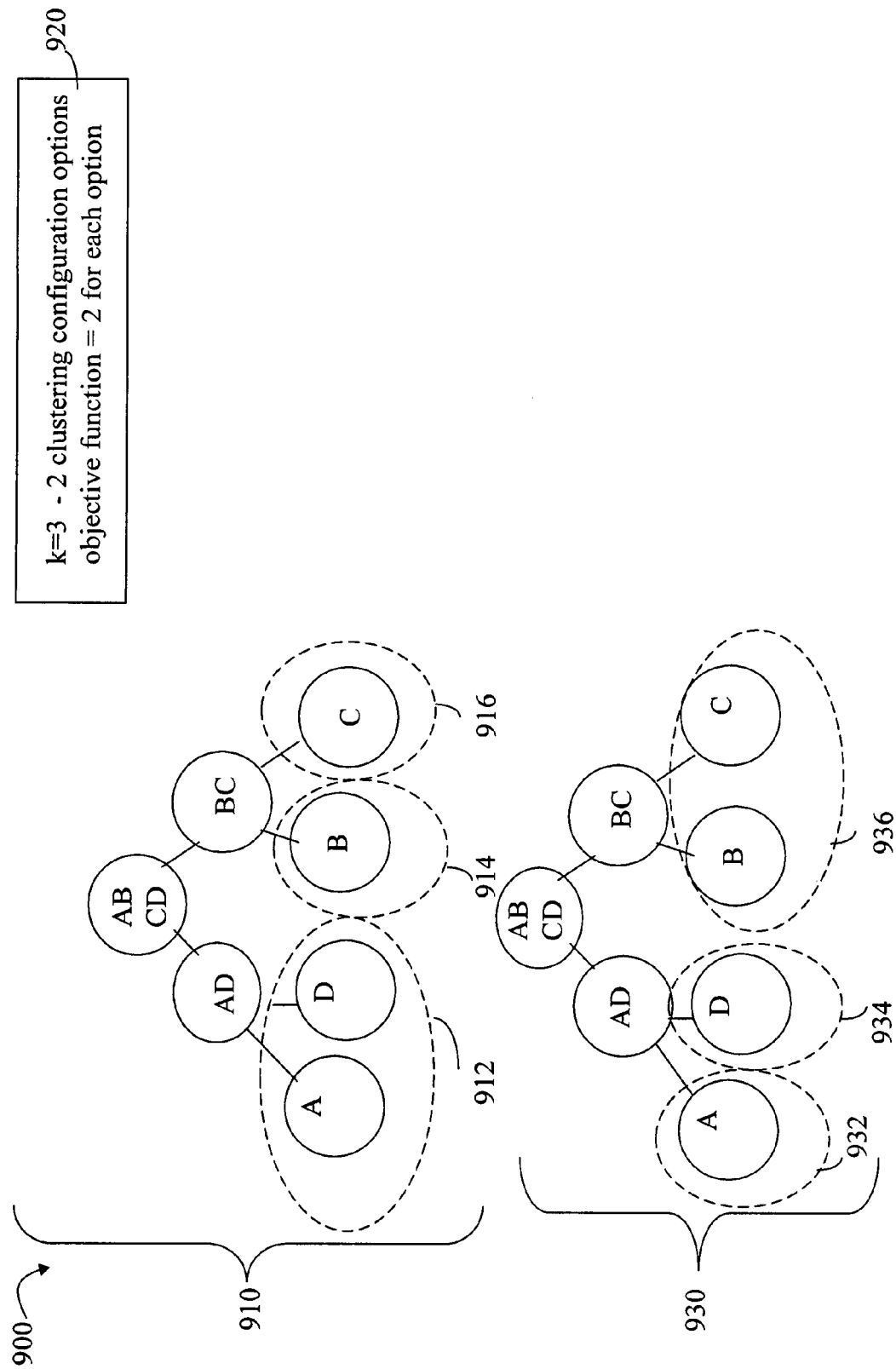
Figure 16:
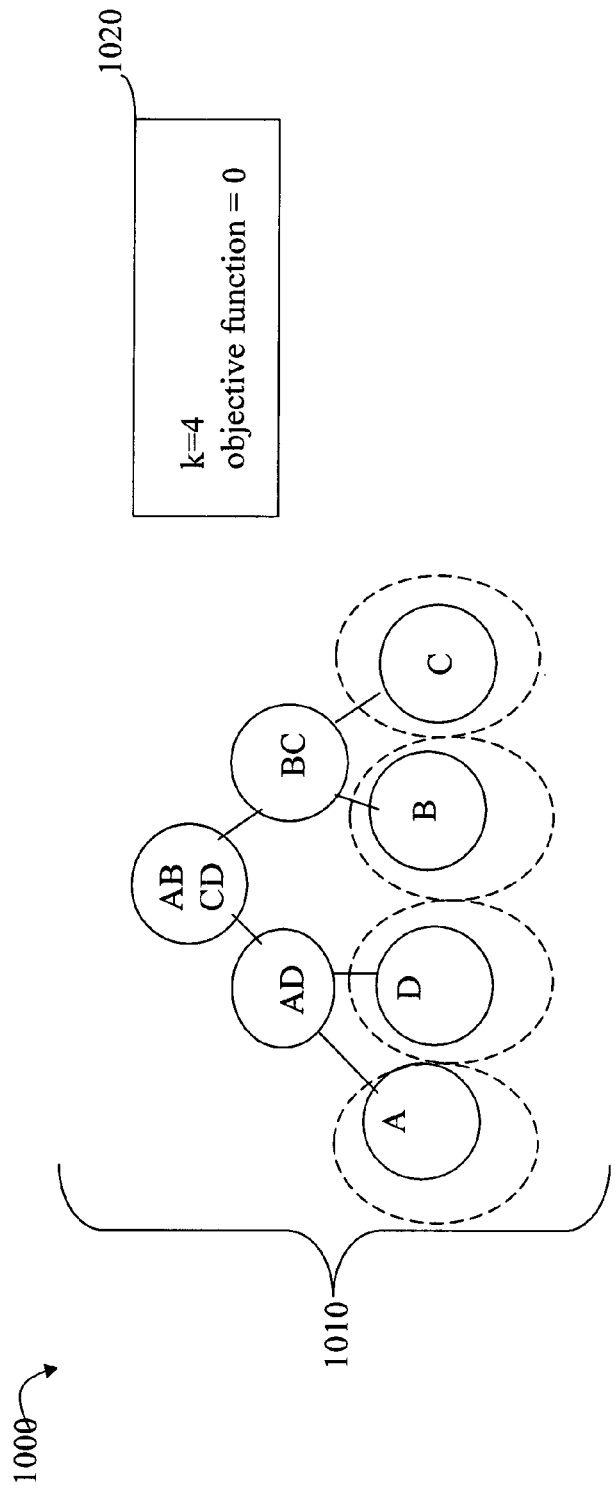

Progressing up to the next level in the tree 600, processing is performed for the root node for possible values of k=1, 2, 3, or 4 as illustrated in FIGS. 14-16.

Referring now to FIG. 14, shown is an example illustrating clustering configuration options evaluated for the root node for k=1 and 2. If k=1, the single clustering configuration of 810 is evaluated in which all vertices are in a same cluster. The objective function, which is the sum of the weights of all edges in the clustering, is 6 as included in 820 (e.g., 6=sum of all edge weights in 504). If k=2 as illustrated in 820, there is one possible configuration of 2 clusters 832 and 834—a first cluster of AD and a second cluster of BC. For k=2, the objective function value is 4 as included in 840 based on the sum of the edge weights for AD=2 and BC=2.

Referring now to FIG. 15, shown is an example illustrating clustering configuration options evaluated for the root node for k=3. If k=3 in which three clusters are formed, there are two possible configurations to be evaluated. In a first configuration for k=3 as illustrated in 910, 2 clusters (914, 916) may be formed from the left child of the root node and a single cluster (912) formed from the right child of the root node. In a second configuration of 930 for k=3, 2 clusters (832, 834) may be formed from the right child of the root node and a single cluster (836) formed from the left child of the root node. For the first configuration of 910, the three clusters are A, D, and BC. The objective function for this first configuration has a value of the edge weight of BC=2 as indicated in 920. For the second configuration of 930, the three clusters are AD, B, and C. The objective function for the second configuration has a value of the edge weight of AD=2 as also indicated in 920. Note that in this example, the objective function evaluates to the same for both clustering configuration options 910 and 930. In one embodiment, if one of these two clustering configurations had a higher objective function value, only information for that best clustering configuration needs to be stored for possible use by subsequent levels higher in the tree (e.g., moving upwards towards the root).

Referring now to FIG. 16, shown is an example illustrating clustering configuration options evaluated for the root node for k=4. As illustrated in 1010, if k=4, there is only one possible configuration with 4 clusters each having a single node, A, B, C, D with an objective function value of 0 as included in 1020 since each vertex or node is in a separate cluster.

In connection with the techniques herein, the optimal or best solution for each clustering configuration (e.g., best possible solution for each value of k) is saved. With this example, an upper bound of k=2 is specified in the optimal solution criteria but the best solutions for values of k=1.4, inclusively, may be saved and used in computing subsequent objective function values. The best solution for our example is k=1 having the objective function value of 6.

When evaluating possible clustering configurations using the tree structure, only a particular subset of all possible clustering options is considered in accordance with the tree structure. For example, in accordance with the tree structure of FIG. 8, AB or AC is not considered as a possible cluster in any clustering configuration due to the tree structure. In other words, there is no node in the tree which consists only of nodes AB or AC. As such, the foregoing are not considered as a possible cluster in any clustering configuration. When at level n in the tree, possible groupings of clusters considered are those at level n or a level lower in the tree (e.g., lowest tree level being the leaf nodes and the highest tree level being at the root node).

As will be appreciated by those skilled in the art, dynamic programming can be performed using any one of a variety of different objective functions. Depending on the objective function, existing techniques may be used to determine the optimal clustering configuration.

The foregoing example illustrates optimal clustering criteria with two parameters. A first parameter indicates a maximum or upper bound of k-clusters and a second parameter specifies a single particular function to be evaluated for each clustering configuration. In the foregoing example, the function evaluates the sum of the edge weights within each cluster in the configuration. The higher the foregoing second parameter value for a clustering configuration, the better or more optimal the solution.

Rather than specify an upper bound for k, an embodiment may also use criteria including two parameters. Rather than specify a first parameter which is an upper bound of k-clusters and a second parameter that is an objective function, the criteria may specify two objective functions to be evaluated for each clustering configuration. For example, a first function may be to compute, for a clustering configuration, a sum total weight for all edges across clusters in the configuration. In other words, if a clustering configuration includes 3 clusters, the first function value is determined as the sum of the weights of all edges having different end points in different clusters. The goal of this function may be to minimize this first function value so that the lower the first function value, the better the clustering configuration. The criteria may also include a second function as described in connection with the example above illustrated with FIGS. 12-16 (e.g., maximizes the sum of the edge weights within each cluster in the configuration).

It should be noted that an embodiment may specify any one or more criteria for use in determining an optimal clustering configuration. For example, rather than specify criteria including two objective functions or an upper bound for k and a single objective function, an embodiment may specify three or more objective functions, or a single objective function as the criteria.

What will now be described in following paragraphs are other possible objective functions that may be used alone, or in combination with other criteria, such as an upper bound for k. Described in following paragraphs are the k-means objective function, the min-diameter objective function, and the min-sum objective function, and correlation clustering function although others may be used in connection with the techniques described herein. If the function is trying to maximize the objective function g, the dynamic program will find a clustering $C_{OPT-TREE}$ in the tree such that $g(C_{OPT-TREE}) \geq g(C)$, for any clustering C in the tree. Note that the best clustering as determined in accordance with specified criteria may not be the best possible clustering. The particular clustering configuration evaluated as "best" may vary with the specified criteria used in an embodiment.

It should be noted that the running time of the merge phase depends on both the number of times the various criteria, such as the various objective functions, are evaluated as well as the evaluation time of the objective function itself.

The k-means objective function seeks to find a k-clustering such that the sum of the squared distances of the points in each cluster to the centroid $p_i$ of the cluster is minimized:

$$g(\{C1, \ldots, Ck\}) = \sum_i \sum_{u \in Ci} d(u, p_i)^2.$$

The centroid of a cluster may be expressed as an average of the points or objects in the cluster. The distance and centroid are with respect to a quantity, such as a user-specified quantity, other than similarity values. Another quantity associated with each object that may be used in computing the distance for use in connection with the merge phase and objective function(s). As with the similarity, this quantity may also represent or characterize aspects of each object. For example, the distance between two objects may be a difference between one or more selected feature values associated with each object in contrast to the similarity which uses all feature values associated with an object. The user may also specify another quantity associated with each object for use in computing the distance. The centroid represents the average or mean value of the foregoing quantity for the objects contained in the cluster so that the foregoing equation represents a sum of differences of each object's quantity in the cluster from the centroid. As will be appreciated by those skilled in the art, this problem may be characterized as NP-hard. Heuristics, such as the k-means algorithm, and approximation algorithms are known in the art that may be used in computing the optimal clustering. For example, the k-means algorithm is described in J. A. Hartigan and M. A. Wong, "A k-means clustering algorithm", Applied Statistics, pages 100-108, 1979. A technique that may be used to approximate the k-mean in linear time is described, for example, by A. Kumar, S. Sen, and Y. Sabharwal, "A simple linear time $(1+\epsilon)$-approximation algorithm for k-means clustering in any dimensions", Proceedings of the 45th Annual IEEE Symposium on Foundations of Computer Science, pages 454-462, 2004.

Let OPT-TREE(C, i) be the optimal tree-respective clustering for C using i clusters. Let $C_l$ and $C_r$ be, respectively, the left and right children of C in the tree, T. The following recurrence may be specified:

OPT-TREE$(C,1)=\{C\}$ since we are constrained to only use 1 cluster. When i>1, we have:

OPT-TREE$(C,i)$=OPT-TREE$(C_l,j)\cup$OPT-TREE$(C_r,i-j)$ where $j=argmin_{1 \leq j < i}g$(OPT-TREE$(C_l,j)\cup$OPT-TREE$(C_r,i-j))$.

Using the dynamic programming technique, the optimal clustering for the leaf nodes may be determined first and used in connection with determining the optimal clustering efficiently for any interior node so that OPT-TREE(root, k) gives the optimal clustering.

The min-diameter function may be specified as an objective function for use with techniques herein. For this function, we wish to find a k-clustering for which the cluster with maximum diameter is minimized:

$g(\{C_1, \ldots, C_k\})$=max diam$(Ci)$.

The diameter of any cluster is the maximum distance or largest difference in values between any pair of objects in the cluster. The above seeks to find a minimum of these values for all clusters. As in connection with the centroid and distance, this objective function may use the user-defined quantity associated with each object in computing the objective function. A similar dynamic program to that as described above can find the optimal tree-respective clustering. Techniques for computing this objective function using dynamic programming are known in the art, such as, for example, by C. Chekuri, T. Feder, and R. Motwani, "Incremental clustering and dynamic information retrieval", Proceedings of the 29th Annual ACM Symposium on Theory of Computing, pages 626-635, 1997.

Another objective function that may be used in connection with the techniques herein is the min-sum function which seeks to minimize the sum of pairwise distances within each cluster:

$$g(\{C_1, \ldots, C_k\}) = \sum_{i=1}^{k} \sum_{u,v \in Ci} d(u, v).$$

As in connection with the centroid and distance described above, this objective function may use the user-defined quantity associated with each object in computing the objective function distances. An optimal tree-respective clustering in the tree T may be computed using dynamic programming techniques similar to that as described above, for example, in connection with the k-means function. It will be appreciated by those skilled in the art that although approximation algorithms are known for this problem, as well as the min-diameter, the running times may be too large for use with large data sets. Techniques for use with the min-sum function are described, for example, by W. F. de la Vega, M. Karpinski, C. Kenyon, and Y. Rabani, "Approximation schemes for clustering problems", Proceedings of the 35th Annual ACM Symposium on Theory of Computing, pages 50-58, 2003.

An embodiment may also use correlation clustering in which a first function is used to determine the similarity within each cluster, and a second function is used to determine the similarity between different clusters. Each function specifies a different criterion or constraint used in determining an optimal configuration and number of clusters. An aggregate or composition function may be used in evaluating the foregoing two functions in combination. In this example, the composition function may be defined as minimizing the dissimilarities within clusters plus the similarities between clusters.

For correlation clustering, suppose there is a graph where each pair of vertices is either deemed similar (red) or dissimilar (blue). Let R and B, respectively, be the set of red and blue edges. Correlation clustering seeks to find a partition that maximizes the number of agreements between a clustering and the edges. In other words, correlation clustering seeks to maximize the sum of the number of red edges within clusters plus the number of blue edges between clusters:

$$g(\{C_1 \ldots C_k\}) = \sum_i |\{(u, v) \in R \cap Ci\}| + \frac{1}{2}|\{(u, v) \in B : u \in Ci, v \in U \setminus Ci\}|.$$

Let C be a cluster in the tree T, and let $C_l$ and Cr be its two children. The dynamic programming recurrence for OPT-TREE(C) is:

OPT-TREE$(C)$=argmax$\{g(C),g$(OPT-TREE$(Cl)$ $\cup$OPT-TREE$(Cr))$.

Alternatively, if pairwise similarities are expressed in a binary form, such as with a bit flag indicator, where 0 means dissimilar and 1 means similar, we can define two thresholds t1 and t2. Edges with similarity greater than t1 are colored red and edges with similarity less than t2 are colored blue. The foregoing correlation clustering objective function can be applied to these new sets of edges R(t1) and B(t2). Approximation algorithms are known in the art for computing the correlation clustering although the techniques used, such as linear and semidefinite programming, incur large computational overhead and may not be practical for use with certain data sets. Techniques for use with the correlation clustering function are described, for example, by N. Bansal, A. Blum, and S. Chawla, "Correlation clustering", Proceedings of the 43rd IEEE Symposium on Foundations of Computer Science, pages 238-247, 2002, and M. Charikar, V. Guruswami, and A. Wirt, "Clustering with qualitative information", Proceedings of the 44th Annual IEEE Symposium on Foundations of Computer Science, pages 524-533, 2003, as well as E. D. Demaine and N. Immorlica, "Correlation clustering with partial information", Proceedings of the 6th International Workshop on Approximation Algorithms for Combinatorial Optimization Problems, pages 1-13, 2003, and also by D. Emanuel and A. Fiat, "Correlation clustering-minimizing disagreements on arbitrary weighted graphs", Proceedings of the 11th European Symposium on Algorithms, pages 208-220, 2003, and C. Swamy, "Correlation clustering: Maximizing agreements via semidefinite programming.", Proceedings of ACM-SIAM Symposium on Discrete Algorithms, pages 519-520, 2004.

Figure 17:
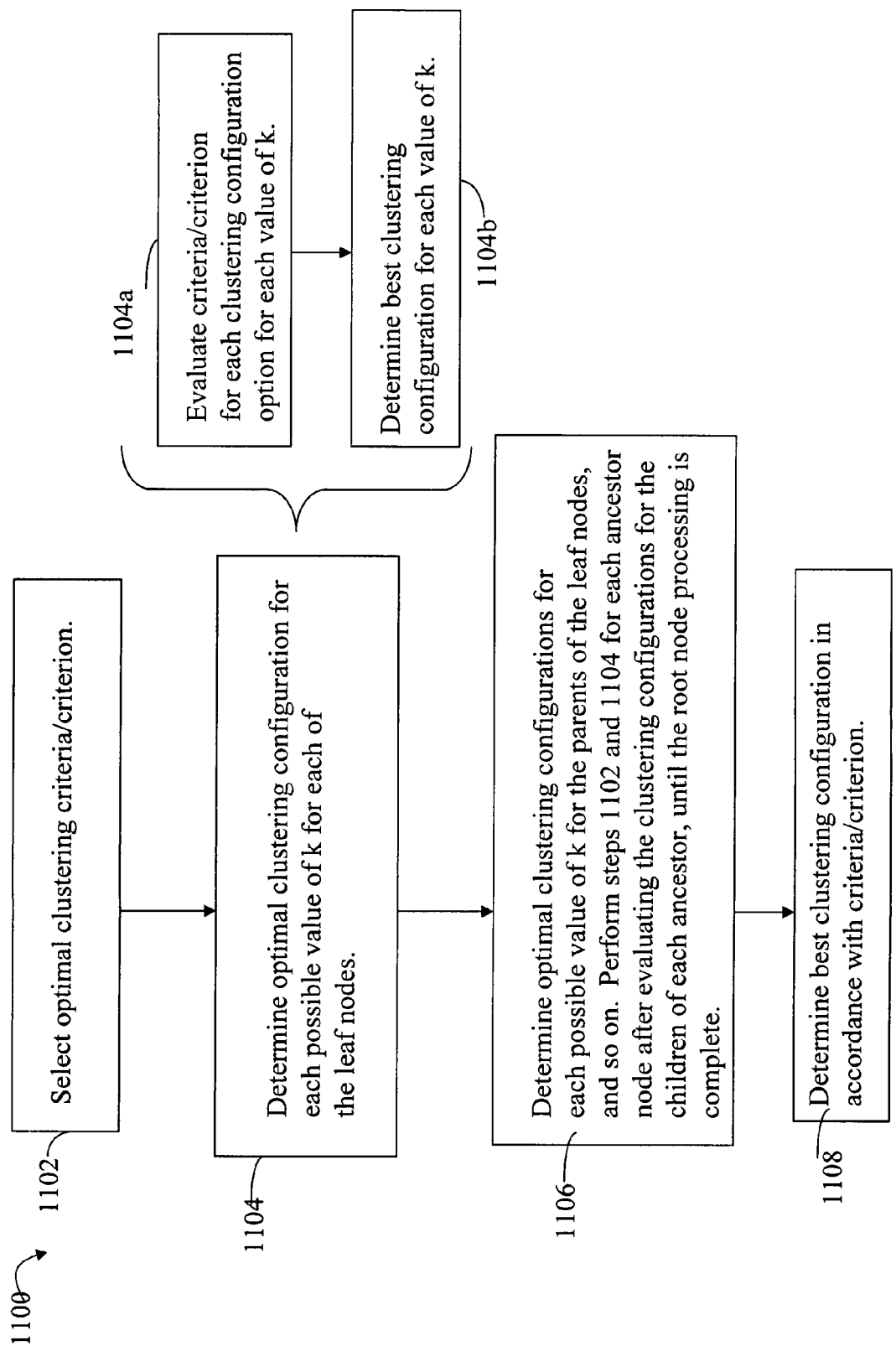
FIG. 17 is a flowchart of processing steps that may be performed in an embodiment in connection with merge processing.

Referring now to FIG. 17, shown is a flowchart of processing steps that may be performed in an embodiment for merge processing. The steps of 1100 summarize processing as described above. At step 1102, the optimal clustering criteria/criterion is selected. As described herein, the criteria may include single objective function, multiple objective functions, an upper bound for the number of clusters into which the entire data set is partitioned, and the like. At step 1104, the optimal clustering configuration for each possible value of k for each of the leaf nodes is determined. Step 1104 may include performing steps 1104a and 1104b. In step 1104a, processing is performed to evaluate the criteria of step 1102 for each clustering configuration option for each value of k. In step 1104b, the best of the one or more clustering configurations is selected for each value of k. For example, referring back to FIG. 15 for the root node, k=3, had two clustering configuration options which are evaluated, as in step 1104a, and a selection is made in step 1104b to determine the best of the options evaluated in step 1104a. With reference to FIG. 15, both configuration options are equally good in terms of the objective function value so an embodiment may select one of these, randomly or using other selection criteria, to be saved as the best. After the leaf nodes are processed, control proceeds to step 1106 to process parent nodes in a bottom-up ordering in the tree towards the root. Each ancestor node is recursively processed after evaluating the clustering configurations for the children of each ancestor node until the root node has been processed. At step 1108, the best clustering configuration is determined in accordance with the criteria/criteria of step 1102.

In one embodiment, fixed selections for the criteria used to evaluate clustering configurations may be utilized. For example, an embodiment may use a same objective function along with a fixed upper bound on k, the number of clusters in the final partitioning of the data set, for each data set evaluated in the merge processing. Alternatively, an embodiment may present a user, as with a GUI (graphical user interface), with multiple objective functions and/or values for k that may be used. A user may select a value for k and/or one or more of the objective functions for use in connection with the techniques described herein. An embodiment may also utilize other techniques, such as callback functions, which allow the user to provide one or more user-defined objective functions. The callback functions may be invoked in connection with performing the merge phase as described herein.

It should be noted that in some applications utilizing the divide phase as described herein, knowledge about the dataset can be used to halt the spectral algorithm of the divide phase before a complete tree is constructed. For instance, if the number of clusters k desired is small (k being included in the criteria for merge phase processing), the recursive step 630 of FIG. 9 (e.g., also step 662 of FIG. 10) does not need to be applied after depth k, since all k-clusterings in the tree use nodes above depth k. As used in the foregoing, the depth k refers to the depth or level from the root, the root having a depth of 1 and the leaf nodes having the greatest depth level. Consider, for example, if a node t at depth k+1 is a cluster, then no node along the path from t to the root is also a cluster. Since each node along this path has two children, and each leaf node must be covered by an interior node, there are at least k+1 other nodes that need to be covered by distinct clusters, contradicting the use of only k clusters. With reference to the example with divide phase processing of FIGS. 6-8, if the criteria for merge phase processing includes an objective function and also specifies an upper bound on the number of clusters, k=2, then the divide phase processing does not have to perform processing to generate the leaf nodes A, D, B, and C since at most 2 clusters are included in the final partitioning of the data set. In other words, each element of the data set must be included in the same cluster (k=1) or in one of two clusters (k=2).

Described herein are techniques for clustering a data set of objects utilizing both a top-down and bottom-up approach to create both a hierarchy and a flat clustering. In the divide phase, a divisive algorithm may be applied to the data set to form a tree T whose leaves are the objects. Divide phase criterion/criteria may be specified to determine the best way to repeatedly divide a set of objects associated with a node in the tree. The divide phase is followed by the merge phase in which processing starts with each leaf of T in its own cluster and merges clusters going up the tree. The final one or more clusters form a partition of the dataset and are tree-respecting clusters, i.e., they are subtrees rooted at some node of T. Merge phase criterion/criteria may be specified to determine the best way to cluster the objects in accordance with the tree structure. The final one or more clusters form a partitioning of the dataset and are tree-respecting clusters, i.e., they are subtrees rooted at some node of tree generated as an output of the divide phase.

The techniques described herein may be used in connection with a variety of different types of data sets and uses. The techniques described herein may be used in connection with clustering or grouping such data sets into smaller similar subsets. As one example, the techniques described herein may be used in connection with clustering medical-related data. Clustering diseases from data involving diagnoses, procedures and drugs can provide an organization of medical knowledge. The clustering techniques described herein may be used, for example, in predicting which patients will develop an illness or progress to a more advanced stage of an existing illness, to assess the quality of patient healthcare, and the like. The techniques described herein may be used with data sets from health care insurers, medical management companies, and patient records such as from doctors and/or hospitals.

One application of the techniques herein is in connection with data mining to provide predictions in medical and/or healthcare costs. The clustering techniques herein, when applied to a set of sample data, may be used to automatically detect patterns in the data and cluster together health care members who are similar. The techniques herein may be used to first cluster members of the sampled data together using only their cost data. The result places members within a particular cluster who all have similar cost-characteristics. Then, for each cost-similar cluster, the clustering techniques herein may be applied on member medical data to create clusters whose members both have similar cost characteristics as well as medical conditions. We then assign a forecast for a particular cluster based on the known result period's costs of the learning sample. To illustrate, a group of members may be clustered using the techniques herein using cost characteristics only. Through experimentation of the inventors, it was found that all members have relatively low cost until the last six months of the observation period, but a greater cost in the last months of the period. A key observation is that when using cost information only, the techniques herein did not distinguish between the members in the cluster. The algorithm uses medical information to identify subgroups within the cost cluster and partitions the members into two sub clusters. The table below shows some of the medical characteristics with the greatest difference in prevalence between the two groups. The first two columns show the percentage of members in each cluster who have a certain diagnosis, have had a procedure, or are taking a drug.

| Frequency in cluster one | Frequency in cluster two | Description |
| --- | --- | --- |
| 18% | 72% | Physical therapy |
| 29% | 83% | Durable medical equipment |
| 14% | 66% | Orthopedic surgery, exclude endoscopic |
| 4% | 48% | Osteoarthritis |
| 39% | 3% | Risk factor: amount paid for injectables greater than $4,000. |
| 71% | 38% | Pathology |
| 32% | 0% | Hematology or oncology infusions |
| 7% | 38% | Rehab |
| 21% | 52% | Musculoskeletal disorders |
| 25% | 3% | Emetics |
| 25% | 3% | Blood products or transfusions |
| 18% | 0% | Cancer therapies |

The first cluster consists of members that have pathology, cytopathology, infusions and other indicators of cancer indicating a potentially serious health problem that is likely to lead to higher health care costs in the future. The second cluster on the other hand consists predominantly of members who are in physical therapy and have had orthopedic surgery and have other musculoskeletal characteristics. It can be expected that these members in the second cluster will be getting better, and thus have lower health care costs in the following year.

The techniques herein may be used to perform data mining of medical data to extract medical insights by identifying patterns in the data based on clustering. For example, the inventors used the techniques herein to analyze medical data on a sample set of women between 45 and 65. It was observed that there was a strong association between estrogens and antidepressants so that the probability of a member being on a depressant increased by 166% if the member was taking estrogen.

As another example using medical data, the following table shows information on two additional clusters that both contain cardiac patients.

| Prevalence | Description |
| --- | --- |
| | Cluster 1 |
| 41% | Antihyperlipidemic drugs |
| 38% | Ace inhibitors & comb. |
| 34% | Calcium channel blockers & comb. |
| 33% | Hypertension |
| 25% | Nonsteroidal/Anti-Inflam. agent |
| 25% | Opiate agonists |
| 24% | Beta blockers & comb. |
| 13% | Cardiac drugs |
| 13% | Hypotensive agents |
| 13% | Antidiabetic agents, misc. |
| | Cluster 2 |
| 44% | Antihyperlipidemic drugs |
| 37% | Hypertension |
| 33% | Ace inhibitors & comb. |
| 31% | Beta blockers & comb. |
| 30% | Chest pain |
| 27% | Gastrointestinal drugs |
| 27% | CAD |
| 23% | Calcium channel blockers & comb. |
| 22% | Diabetes mellitus |
| 15% | Cardiac drugs |

The foregoing shows the top ten most distinguishing features of two clusters of cardiac patients. Cluster 1 contains members that have significantly higher health care costs in the result period compared to the observation period while Cluster 2's members have significantly lower health care costs in the observation period. A distinguishing feature of a cluster is a diagnosis/procedure or drug that has more prevalence among members of the cluster than in the general population.

The members of the first cluster have significantly higher health care costs in the result period, while members of the second cluster have significantly lower health care costs. Comparing the characteristics of each cluster, the inventors observed that they are very similar except for the fifth factor of the first cluster, the presence of nonsteroidal anti-inflammatory agents. This observation, together with recent reports of increased cardiac risk in patients taking Cox 2 inhibitors, led the inventors to analyze the costs and cardiac outcomes of members taking Cox 2 drugs. The inventors compared overall costs and the prevalence of CAD between patients of the study sample who had taken only Cox 1 drugs and patients who had taken only Cox 2 drugs, as presented in the table below providing anti inflammatory comparisons. In particular, the table below shows a comparison of costs and cardiac outcomes in the result period for members taking Cox 1 and Cox 2 drugs in an observation period.

| | Cox 1 | Cox 2 | p-value |
| --- | --- | --- | --- |
| Number of Members | 10,234 | 4,812 | |
| Average Cost | $3,973 | $7,105 | <0.001 |
| CAD prevalence | 0.04 | 0.05 | 0.007 |

Differences in Coronary Artery Disease (CAD) prevalence were significant at the p<0.001 level. The clustering techniques herein discovered autonomously that cardiac patients taking nonsteroidal anti-inflammatory agents have higher costs in the following year. The algorithm may reveal unexpected associations among diagnoses, procedures and drugs and may identify potential safety issues with drugs in common use, in addition to cost prediction. The techniques herein, as just described, may be used as a methodology for drug surveillance.

The foregoing are illustrative examples of how the techniques herein may be used in connection with medical data.

The techniques described herein may be used in connection with clustering financial data. For example, the techniques described herein may be used in connection with clustering financial returns from various asset classes to guide asset allocation decisions as may be utilized by large financial institutions.

The techniques described herein may be used in connection with clustering email and/or desktop files (e.g., including text and non-text files, such as images). For example, email may be clustered at an enterprise level to detect varying types of spam. Based on features associated with these different types of spam, new rules may be determined for spam filtering of subsequent emails of the same spam types. The techniques herein may be used to locate related files, emails, and the like on a computer system, for example, based on user-entered keywords.

The techniques described herein may be used in connection with clustering transactions for fraud detection. For example, credit card companies can search customer transactions reflecting the behavior of customers to detect fraudulent activity by clustering transaction data.

In one embodiment, the techniques herein may be utilized in a search engine that discovers the clustered structure for queries and identifies each cluster by its three most significant terms. In one embodiment, this search engine may utilize output from another search engine, such as Google. The user inputs a query which is then used to find 400 results from Google, a standard search engine. Each result contains the title of the webpage, its location, and a small snippet from the text of the webpage. A document-term matrix representation of the results may be constructed as described and illustrated in FIG. 2. Each result is a document and the words in its title and snippet make up its terms. The document term matrix may include a row for each document. Each element in a row may correspond to a particular word in the document snippet having a value, for example, corresponding to the number of times the word appears in the snippet. The snippet may be preprocessed or filtered, for example, to remove stopwords. As known in the art, stopwords may be characterized as common words (i.e., a, of, the, on) that have little or no meaning by themselves. The similarity between two results is the inner product between their two term vectors. The divide phase may be implemented using the spectral algorithm as described herein, for example, in FIG. 10. For the merge phase, the following objective function may be used which may be referred to herein as relaxed correlation clustering:

$$\sum_i \alpha \left( \sum_{u,v \in Ci} 1 - A_i \cdot A_v \right) + \beta \left( \sum_{u \in Ci, v \notin Ci} A_u A_v \right) \quad \text{EQUATION E1}$$

In this embodiment, each row $A(u)$ is normalized to have Euclidean length 1 to ensure that the maximum similarity between any pair of rows is 1. A value of $\alpha=0.2$, and $\beta=0.8$ may be used. The first term in EQUATION E1 measures the dissimilarity within a cluster, i.e. how "far" a cluster is from a set in which every pair is as similar as possible (for all u, v, $A(u) \cdot A(v)=1$). Note that the first term is a relaxed notion of the blue edges within a cluster from correlation clustering as described elsewhere herein. The second term in EQUATION E1 measures the amount of similarity the clustering fails to capture, since it occurs across clusters. Similarly, the second term is a relaxed notion of the red edges outside clusters. The benefit of using the relaxed correlation clustering objective function is that it does not depend on a predefined number of clusters k. This is appropriate for the particular application for searching since the number of meanings or contexts of a query is not known beforehand. Based on results observed by the inventors, the foregoing objective function in this application produces results including large interesting subsets of the data while also placing unrelated results each in their own cluster.

The techniques herein may be used on different types of data, for example, text data, gene expression data, and categorical data. Each type of data may come from a variety of different sources. For example, for text data, the techniques herein may be used to group related documents together based on text words in each document. The document may be a news article, web page, abstract from a journal, and the like. Categorical data is similar to text data in that it does not naturally have a defined ordering, for example, as with numerical data. However, in contrast to text data, each categorical data object is not a document containing terms, but rather a vector of characteristics, each of which takes on non-numerical labels. One example of categorical data may be the Congressional voting dataset in which each data object is a Congressman, and the vector of characteristics is how he/she voted on every bill or law put through Congress. The true clustering of Congressmen may be their political party affiliations and the way in which each Congressman voted may be used with the techniques herein to group like-Congressman having the same political party affiliation together in a cluster. As another example of categorical data, each data object may be data about a particular mushroom described by a number of features such as, for example, odor, habitat, and the like. Each mushroom may be either poisonous or edible based on the values of the features and the techniques herein may be used to accordingly group mushrooms into these two classifications.

The techniques herein may be applied for use with gene expression data. In one embodiment, a microarray chip may be a solid surface upon which spots of DNA are attached in a matrix-like configuration. By exposing the chip to RNA, the expression level (e.g., activity of the gene) can be determined for each gene on the microarray chip. The techniques herein may be used to discover new subtypes of cancer by clustering microarray data. The approach is to cluster gene expression data from several patients with a certain type of cancer. If a strong clustering exists, the clustering may designate different subtypes of cancer. This relies on the hypothesis that gene expression levels can distinguish different subtypes of cancer. Using the techniques herein in one embodiment, the spectral algorithm as described in FIG. 10 may be run on the gene expression data which is preprocessed as follows. First, the data is normalized. For example, the expression level of each gene may be normalized over a number of samples such that the mean is zero and the standard deviation is 1. In this example, there may be 7,000 human genes in each sample. A matrix may be created having a row for each sample. Each row contains 14,000 elements so that the first 7,000 elements are used if the sample has positive values (e.g., standard deviation >0) and the second 7,000 elements of a row may be used if the sample has negative values (e.g., standard deviation <0). The similarity between two samples (i.e. two rows of N) may be the inner product of the rows for each sample. Thus, if two samples have a large inner product, they have a similar gene expression profile.

As described above, an embodiment may optionally utilize weights as generated in connection with the preprocessing phase. It should be noted that although the preprocessing phase is described in connection with the divide and merge phases herein, the preprocessing phase may be used more generally in connection with feature selection and weighting with other techniques. For example, the preprocessing phase for weighting features may be used in connection with feature selection for learning algorithms, prediction algorithms, and the like. The preprocessing phase may be used, for example, in connection with determining which features are important for trending.

It should be noted that an embodiment may also perform other processing phases or steps, such as other preprocessing of the data set, than as described herein. For example, an embodiment may preprocess or filter text-based documents to remove occurrences of certain common words, such as "the" and "a". The particular preprocessing may vary with the particular data set.

It should also be noted that although the merge phase processing is described herein in connection with particular techniques used in the divide phase processing to generate the binary tree, an embodiment may use different techniques in the divide phase processing to generate a hierarchical clustering. For example, an embodiment may utilize other recursive partitioning techniques known in the art to generate a hierarchical clustering which is used an input to the merge phase. As described herein, an embodiment of the divide phase may generate as an output a binary tree as a hierarchical clustering arrangement used as an input to the merge processing. An embodiment of the divide phase may also generate other hierarchical clustering arrangements. For example, divide phase processing may generate a tree structure which is more generally an n-ary tree structure, n representing the number of possible child nodes of a parent node in the tree. An embodiment may also represent the hierarchical clustering generated as an output of the divide phase using other data structures than as described herein.

Although particular examples and types of data sets have been utilized for illustration, those skilled in the art will appreciate that the techniques described herein may be used in connection with many other types of data sets and applications.

In one exemplary embodiment described herein, a spectral algorithm has been described (e.g., FIGS. 9-10) for the divide phase and any one or more different criteria, including one or more different objective functions, may be used in connection with the merge phase. However, it will be appreciated by those skilled in the art that different techniques may be used in an embodiment. For example, an embodiment may the same objective function for the divide phase as the merge phase. In other words, for the divide phase, recursively find the optimal clustering according to the objective function resulting in a hierarchical clustering tree. Rather than use the conductance as the divide phase criteria, an embodiment may use other criteria, for example, such as an objective function as described elsewhere herein as used with the merge phase. In the merge phase, the same objective function may be used to find the best clustering. In such an implementation using an objective function in the divide phase, dynamic programming techniques may be utilized as described for the merge phase as well as other techniques in connection with computing the appropriate function values While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for clustering a data set of objects comprising:
   performing divide phase processing to partition the data set into two or more partitions forming a hierarchy of the objects, said divide phase processing including:
      computing a second largest eigenvector, or an approximation thereof, for a normalized similarity matrix representing similarities between objects in the data set;
      ordering the objects in accordance with an increased ordering of elements of the eigenvector; and
      selecting a cut from a set of one or more cuts determined in accordance with said ordering of the objects, each of said one or more cuts indicating a way in which the objects are partitioned into two partitions; and
   performing merge phase processing using the hierarchy to determine one or more disjoint clusters of objects of the data set.

2. The method of claim 1, wherein the divide phase processing further comprises:
   repeatedly partitioning each of the two partitions, wherein the hierarchy has a number of levels in accordance with a number of times the data set, or a portion thereof, is partitioned.

3. The method of claim 2, wherein the divide phase processing partitions a portion of the data set into two pieces, each of said two pieces have a number of objects determined in accordance with one or more dividing criteria.

4. The method of claim 1, wherein merge phase processing further comprises:
   merging objects of the data set into one or more clusters in accordance with one or more merging criteria and in accordance with nodes of the hierarchy, each node being associated with one or more objects of the data set.

5. The method of claim 1, wherein an input to the divide phase is the normalized similarity matrix of pairwise similiarities between pairs of objects in the data set.

6. The method of claim 5, wherein a pairwise similarity between a pair of objects is expressed as an inner product of a first vector of features characterizing a first object of the pair and a second vector of features characterizing a second object of the pair.

7. A computer implemented method for clustering a data set of objects comprising:
   performing divide phase processing to partition the data set into two or more partitions forming a hierarchy of the objects; and
   performing merge phase processing using the hierarchy to determine one or more disjoint clusters of objects of the data set, wherein an input to the divide phase is a matrix of pairwise similiarities between pairs of objects in the data set, wherein a pairwise similarity between a pair of objects is expressed as an inner product of a first vector of features characterizing a first object of the pair and a second vector of features characterizing a second object of the pair, and wherein the divide phase further comprises:

normalizing each row of the matrix of similarities based on a sum of each row;

computing a second largest eigenvector of the matrix;

sorting eigenvector elements in increasing order, the eigenvector having n elements;

evaluating "n−1" cuts in accordance with one or more divide phase criteria, each of said "n−1" cuts indicating one way in which the objects are partitioned with a first portion of objects included in a first partition and a second portion of remaining objects included in a second partition;

selecting one of said "n−1" cuts in accordance with the divide phase criteria; and performing said normalizing, said computing, said sorting, said evaluating and said selecting steps recursively on each of said first partition and said second partition.

8. The method of claim 7, wherein said selecting step selects one of the "n−1" cuts resulting in two partitions, S and T, of objects in the data set that minimizes conductance represented as a sum of similarities between each pair of objects, wherein a first object in said each pair is in S and a second object in said each pair is in T, divided by a smaller of a size of S and a size of T, and wherein each similarity is expressed as a product of a first feature vector for said first object and a second feature vector for said second object.

9. The method of claim 4, wherein said hierarchy is a tree having a root node at a top level, one or more leaf nodes at a bottom-most level and one or more non-leaf nodes at one or more levels between said top level and said bottom-most level, wherein said merge phase recursively performs bottom-up processing of said tree to merge objects associated with nodes of the tree starting with the one or more leaf nodes and progressing upward toward the root node, and merging objects of the data set into one or more clusters in accordance with one or more merging criteria and in accordance with nodes of the hierarchy, each node being associated with one or more objects of the data set.

10. A computer implemented method for clustering a data set of objects comprising:

performing divide phase processing to partition the data set into two or more partitions forming a hierarchy of the objects; and performing merge phase processing using the hierarchy to determine one or more disjoint clusters of objects of the data set, wherein merge phase processing further comprises:

merging objects of the data set into one or more clusters in accordance with one or more merging criteria and in accordance with nodes of the hierarchy, each node being associated with one or more objects of the data set, wherein said hierarchy is a tree having a root node at a top level, one or more leaf nodes at a bottom-most level and one or more non-leaf nodes at one or more levels between said top level and said bottom-most level, wherein said merge phase recursively performs bottom-up processing of said tree to merge objects associated with nodes of the tree starting with the one or more leaf nodes and progressing upward toward the root node, and merging objects of the data set into one or more clusters in accordance with one or more merging criteria and in accordance with nodes of the hierarchy, each node being associated with one or more objects of the data set, and wherein the merge phase further comprises performing, for each leaf node at a bottom-most level in said tree:

evaluating, in accordance with one or more merging criteria, one or more clustering configuration options used in forming k clusters for each value of k, $1 \leq k \leq n$, n representing a maximum number of clusters formed for the bottom-most level;

selecting a best clustering configuration option for each value of k; and performing said evaluating and said selecting for each ancestor node of each leaf node.

11. The method of claim 10, further comprising:

performing said evaluating and said selecting for each ancestor node after evaluating the clustering configurations for the children of each ancestor node until said evaluating and said selecting has been performed for said root node.

12. The method of claim 10, wherein the one or more merging criteria includes an objective function evaluated using dynamic programming.

13. The method of claim 12, wherein the merging criteria includes a k-means objective function generating a return value for a clustering configuration of one or more clusters by determining a sum of squared distances of objects in each cluster of the clustering configuration to a centroid of the cluster, and then adding the sums for each of the clusters to determine a final sum as said return value, and said selecting selects a clustering configuration having a smallest return value determined by the k-means objective function, wherein a distance of an object is a difference between a first value associated with the object and the average of the first values for objects in said each cluster.

14. The method of claim 12, wherein the merging criteria includes a min-diameter objective function generating a return value for a clustering configuration of one or more clusters by determining, for each cluster, a diameter determined as a maximum distance between any pair of objects in said each cluster of the clustering configuration, and then determining as said return value a maximum of the diameters for each of the clusters, and said selecting selects a clustering configuration having a smallest return value determined by the min-diameter objective function, wherein a distance between a pair of objects is a difference between values associated with each object of the pair.

15. The method of claim 12, wherein the merging criteria includes a min-sum objective function generating a return value for a clustering configuration of one or more clusters by determining, for each cluster in the clustering configuration, a sum of pairwise distances within said each cluster and adding said sums for each cluster to determine a final sum as said return value, and said selecting selects a clustering configuration having a smallest return value determined by the min-sum objective function, wherein a distance between a pair of objects is a difference in between values associated with each object of the pair.

16. The method of claim 12, wherein the merging criteria includes a correlation clustering objective function generating a return value for a clustering configuration of one or more clusters, the method comprising:

receiving an indicator for each pair of objects in the data set, said indicator indicating whether the pair of objects is similar or dissimilar;

determining a first sum for each of the one or more clusters, the first sum representing the number of similar pairs of objects in said each cluster;

determining a second sum representing a number of dissimilar pairs of objects wherein a first object of each pair is in a different cluster than a second object of said each pair; and determining a final sum as said return value by adding said first sum for each of the one or more clusters and said second sum, and wherein said selecting selects a clustering configuration having a largest value determined by the correlation clustering objective function.

17. A computer implemented method for clustering a data set of objects comprising:
   performing divide phase processing to partition the data set into two or more partitions forming a hierarchy of the objects; and
   performing merge phase processing using the hierarchy to determine one or more disjoint clusters of objects of the data set, wherein each object in the data set is described by a vector of one or more feature values for corresponding one or more features characterizing said each object, and the method further comprising:
   prior to said divide phase processing, performing preprocessing to determine weights for each of said one or more features.

18. The method of claim 17, wherein said divide phase uses a matrix of pairwise similarities between pairs of objects in the data set, similarity between two objects being represented as a product of feature values for said two objects, and the method further comprising:
   determining weighted similarities between pairs of objects as a product of the weights for said one or more features, a first vector of feature values for a first object in a pair, and a second vector of feature values for a second object in the pair; and
   using said weighted similarities in said divide phase processing to partition the data set into two or more partitions.

19. A computer implemented method for clustering a data set of objects comprising:
   performing preprocessing to determine weights for features characterizing each of said objects;
   repeatedly dividing the data set to form a tree structure based on similarities between pairs of objects and one or more divide phase criteria, each node of the tree structure being associated with one or more objects of the data set, wherein a level is formed in the tree structure each time the data set, or a portion thereof, is partitioned, said similarities being weighted similarities determined in accordance with said weights; and
   starting with leaves of the tree structure and progressing toward a root of the tree structure, merging nodes of the tree structure to form one or more clusters in accordance with one or more merging criteria, each of said one or more clusters being a subtree of the tree structure, wherein the subtree has a root at a node of the tree structure generated by said repeatedly dividing, wherein objects in a same cluster are determined to be similar to one another and objects in a different cluster are determined to be dissimilar from one another.

20. The method of claim 19, wherein said tree structure includes one or more leaf nodes, each of the one or more leaf nodes being associated with a single object in the data set.

21. The method of claim 19, wherein the merging criteria is used to determine a best way to cluster objects in accordance with the tree structure.

22. A computer readable medium comprising executable code stored thereon for clustering a data set of objects, the computer readable medium comprising executable code stored thereon for:
   performing divide phase processing to partition the data set into two or more partitions forming a hierarchy of the objects, said divide phase processing including:
      computing a second largest eigenvector, or an approximation thereof, for a normalized similarity matrix representing similarities between objects in the data set,
      ordering the objects in accordance with an increased ordering of elements of the eigenvector; and
      selecting a cut from a set of one or more cuts determined in accordance with said ordering of the objects, each of said one or more cuts indicating a way in which the objects are partitioned into two partitions; and
   performing merge phase processing using the hierarchy to determine one or more disjoint clusters of objects of the data set.

23. The computer readable medium of claim 22, wherein the executable code for performing the divide phase processing further comprises executable code for:
   repeatedly partitioning each of the two partitions, wherein the hierarchy has a number of levels in accordance with a number of times the data set, or a portion thereof, is partitioned.

24. The computer readable medium of claim 23, wherein the executable code for performing the divide phase processing partitions a portion of the data set into two pieces, each of said two pieces have a number of objects determined in accordance with one or more dividing criteria.

25. The computer readable medium of claim 22, wherein executable code for performing merge phase processing further comprises executable code for:
   merging objects of the data set into one or more clusters in accordance with one or more merging criteria and in accordance with nodes of the hierarchy, each node being associated with one or more objects of the data set, and wherein an input to the divide phase is a matrix of pairwise similiarities between pairs of objects in the data set, a pairwise similarity between a pair of objects is expressed as an inner product of a first vector of features characterizing a first object of the pair and a second vector of features characterizing a second object of the pair.

26. A computer readable medium comprising executable code stored thereon for clustering a data set of objects, the computer readable medium comprising executable code stored thereon for:
   performing divide phase processing to partition the data set into two or more partitions forming a hierarchy of the objects; and
   performing merge phase processing using the hierarchy to determine one or more disjoint clusters of objects of the data set, and
   wherein executable code for performing merge phase processing further comprises executable code for:
      merging objects of the data set into one or more clusters in accordance with one or more merging criteria and in accordance with nodes of the hierarchy, each node being associated with one or more objects of the data set, and wherein an input to the divide phase is a matrix of pairwise similiarities between pairs of objects in the data set, a pairwise similarity between a pair of objects is expressed as an inner product of a first vector of features characterizing a first object of the pair and a second vector of features characterizing a second object of the pair, and
   wherein executable code for performing the divide phase processing further comprises executable code for:
      normalizing each row of the matrix of similarities based on a sum of each row;
      computing a second largest eigenvector of the matrix;

sorting eigenvector elements in increasing order, the eigenvector having n elements;

evaluating "n−1" cuts in accordance with one or more divide phase criteria, each of said "n−1" cuts indicating one way in which the objects are partitioned with a first portion of objects included in a first partition and a second portion of remaining objects included in a second partition;

selecting one of said "n−1" cuts in accordance with the divide phase criteria; and performing said normalizing, said computing, said sorting, said evaluating and said selecting steps recursively on each of said first partition and said second partition.

27. The computer readable medium of claim 26, wherein said executable code for said selecting selects one of the "n−1" cuts resulting in two partitions, S and T, of objects in the data set that minimizes conductance represented as a sum of similarities between each pair of objects, wherein a first object in said each pair is in S and a second object in said each pair is in T, divided by a smaller of a size of S and a size of T, and wherein each similarity is expressed as a product of a first feature vector for said first object and a second feature vector for said second object.

28. The computer readable medium of claim 25, wherein said hierarchy is a tree having a root node at a top level, one or more leaf nodes at a bottom-most level and one or more non-leaf nodes at one or more levels between said top level and said bottom-most level, wherein said merge phase recursively performs bottom-up processing of said tree to merge objects associated with nodes of the tree starting with the one or more leaf nodes and progressing upward toward the root node, and said merge phase merges objects of the data set into one or more clusters in accordance with one or more merging criteria and in accordance with nodes of the hierarchy, each node being associated with one or more objects of the data set.

29. A computer readable medium comprising executable code stored thereon for clustering a data set of objects, the computer readable medium comprising executable code stored thereon for:

performing divide phase processing to partition the data set into two or more partitions forming a hierarchy of the objects; and performing merge phase processing using the hierarchy to determine one or more disjoint clusters of objects of the data set, and wherein executable code for performing merge phase processing further comprises executable code for:

merging objects of the data set into one or more clusters in accordance with one or more merging criteria and in accordance with nodes of the hierarchy, each node being associated with one or more objects of the data set, wherein an input to the divide phase is a matrix of pairwise similiarities between pairs of objects in the data set, a pairwise similarity between a pair of objects is expressed as an inner product of a first vector of features characterizing a first object of the pair and a second vector of features characterizing a second object of the pair, wherein said hierarchy is a tree having a root node at a top level, one or more leaf nodes at a bottom-most level and one or more non-leaf nodes at one or more levels between said top level and said bottom-most level, wherein said merge phase recursively performs bottom-up processing of said tree to merge objects associated with nodes of the tree starting with the one or more leaf nodes and progressing upward toward the root node, and said merge phase merges objects of the data set into one or more clusters in accordance with one or more merging criteria and in accordance with nodes of the hierarchy, each node being associated with one or more objects of the data set, and wherein the executable code for performing the merge phase processing further comprises executable code for performing, for each leaf node at a bottom-most level in said tree:

evaluating, in accordance-with one or more merging criteria, one or more clustering configuration options used in forming k clusters for each value of k, $1 \leq k \leq n$, n representing a maximum number of clusters formed for the bottom-most level;

selecting a best clustering configuration option for each value of k; and performing said evaluating and said selecting for each ancestor node of each leaf node.

30. The computer readable medium of claim 29, further comprising executable code for:

performing said evaluating and said selecting for each ancestor node after evaluating the clustering configurations for the children of each ancestor node until said evaluating and said selecting has been performed for said root node.

31. The computer readable medium of claim 30, wherein the one or more merging criteria includes an objective function evaluated using dynamic programming.

32. A computer readable medium comprising executable code stored thereon for clustering a data set of objects, the computer readable medium comprising executable code stored thereon for:

performing divide phase processing to partition the data set into two or more partitions forming a hierarchy of the objects; and performing merge phase processing using the hierarchy to determine one or more disjoint clusters of objects of the data set, wherein each object in the data set is described by a vector of one or more feature values for corresponding one or more features characterizing said each object, and the computer readable medium further comprising executable code for:

prior to said divide phase processing, performing preprocessing to determine weights for each of said one or more features.

33. The computer readable medium of claim 32, wherein said divide phase uses a matrix of pairwise similarities between pairs of objects in the data set, similarity between two objects being represented as a product of feature values for said two objects, and the computer readable medium further comprising executable code for:

determining weighted similarities between pairs of objects as a product of the weights for said one or more features, a first vector of feature values for a first object in a pair, and a second vector of feature values for a second object in the pair; and using said weighted similarities in said divide phase processing to partition the data set into two or more partitions.

* * * * *